US012553837B2

(12) United States Patent
Fohtung

(10) Patent No.: US 12,553,837 B2
(45) Date of Patent: Feb. 17, 2026

(54) HIGH-VOLTAGE POWER SUPPLY SYSTEM

(71) Applicant: Rensselaer Polytechnic Institute, Troy, NY (US)

(72) Inventor: Edwin Fohtung, Niskayuna, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 897 days.

(21) Appl. No.: 17/775,382

(22) PCT Filed: Nov. 9, 2020

(86) PCT No.: PCT/US2020/059616
§ 371 (c)(1),
(2) Date: May 9, 2022

(87) PCT Pub. No.: WO2021/092537
PCT Pub. Date: May 14, 2021

(65) Prior Publication Data
US 2022/0393599 A1    Dec. 8, 2022

Related U.S. Application Data

(60) Provisional application No. 62/932,569, filed on Nov. 8, 2019.

(51) Int. Cl.
*G01N 23/20008* (2018.01)
*H02M 3/00* (2006.01)
(Continued)

(52) U.S. Cl.
CPC ...... *G01N 23/20008* (2013.01); *H02M 3/003* (2021.05); *H02M 11/00* (2013.01); *H02M 7/537* (2013.01)

(58) Field of Classification Search
CPC  H02M 3/003; H02M 7/537; G01N 23/20008; G11C 11/2275; G11C 11/2297;
(Continued)

(56) References Cited

U.S. PATENT DOCUMENTS 4,325,113 A    4/1982  Tomlie, Jr.
4,972,378 A   11/1990  Kitagawa et al.
(Continued)

OTHER PUBLICATIONS

International Search Report and The Written Opinion of the International Searching Authority, International Application No. PCT/US2020/059616, mailed Feb. 5, 2021.

*Primary Examiner* — Fred E Finch, III
(74) *Attorney, Agent, or Firm* — Barclay Damon LLP; Anthony P. Gangemi

(57) ABSTRACT

A high-voltage power supply system including a high-voltage regulator, a function generator, and a triggering circuit. The high-voltage regulator includes a microcontroller, a digital-to-analog convertor in communication with the microcontroller, and a high-voltage DC-DC converter in communication with the digital-to-analog converter. The function generator includes a high-voltage inverter including one or more MOSFET switches. The high-voltage inverter is in communication with the microcontroller of the high-voltage regulator. The triggering circuit includes one or more high-voltage electromechanical switches.

18 Claims, 19 Drawing Sheets

(51) Int. Cl.
*H02M 7/537* (2006.01)
*H02M 11/00* (2006.01)

(58) Field of Classification Search
CPC .. H01J 37/248; H03K 1/356; H03K 1/356104
See application file for complete search history.

(56) References Cited

U.S. PATENT DOCUMENTS

| | | | |
|---|---|---|---|
| 5,008,800 | A | 4/1991 | Klinkowstein |
| 5,388,064 | A | 2/1995 | Khan |
| 5,512,814 | A | 4/1996 | Allman |
| 5,596,532 | A | 1/1997 | Cernea et al. |
| 5,901,085 | A | 5/1999 | Kramer et al. |
| 5,905,403 | A | 5/1999 | Gillette |
| 6,009,006 | A | 12/1999 | Fernsler |
| 6,760,675 | B1 * | 7/2004 | Szwec ............... H03K 3/64 |
| | | | 702/78 |
| 7,232,699 | B1 | 6/2007 | Lagnado et al. |
| 7,412,284 | B2 * | 8/2008 | Hofmann ............ A61N 1/0502 |
| | | | 435/173.6 |
| 9,379,232 | B2 | 6/2016 | Kelber et al. |
| 9,470,733 | B2 | 10/2016 | Baglio et al. |
| 9,574,802 | B2 | 2/2017 | Binek |
| 9,736,439 | B2 | 8/2017 | Xue |
| 9,743,196 | B2 | 8/2017 | Kropfitsch |
| 2007/0018504 | A1 * | 1/2007 | Wiener ............... H01J 37/285 |
| | | | 307/108 |
| 2011/0235384 | A1 | 9/2011 | Mabuchi et al. |
| 2020/0246612 | A1 * | 8/2020 | Rodriguez ........... H02H 9/041 |

\* cited by examiner

HIGH-VOLTAGE POWER SUPPLY SYSTEM

CROSS REFERENCE TO RELATED APPLICATION(S)

This application claims the benefit of U.S. Provisional Patent Application No. 62/932,569, filed Nov. 8, 2019, which is incorporated by reference as if disclosed herein in its entirety.

FIELD

The present technology relates to the field of high-voltage sources. More particularly, the present technology relates to a high-voltage power supply for driving phase transitions in multiferroic materials.

BACKGROUND

Multiferroic materials described by Landau theory are promised to have a large impact on future electronics and fundamental science. Understanding of numerous effects involved in phase transitions in the materials at the nanoscale, such as the formation of vortex-antivortex pairs in ferroelectric, is essential for bringing these materials into the domain of application. However, the new knowledge can only be gained with combination of high-resolution X-ray and photon probes and high-frequency electric field pumps driving the system's state.

The electrical field is one of the main drivers for the secondary phase transition (e.g., the transition involving ferroelectric polarization changes) in such materials as multiferroics (e.g., with perovskite crystal structure). Applying electrical field on nanoparticles or thin films can translate into change of strain coupled with polarization and induce or modulate topological defects. Eventually, studies of these defects can be used for designing new generation of memory devices, high efficiency solar cells, chemical catalysts, etc.

An electric field application system is needed to solve optimization problems crucial for experiments with nanopowders and thin film samples in synchrotrons and with laboratory laser sources. Such experiments could be made more efficient regarding reliable data acquisition, which therefore accelerates research process at the synchrotron beamlines where the usual time for the experiments is limited to 1 week per 6 months and is obtained through challenging proposal process.

FIG. 1 shows a prior art electric field system 10 with a maximum programmable output voltage of 24V, which is a low voltage programmable power supply usable in a Bragg Coherent Diffraction Imaging experiment with nanopowder of ferroelectric Barium Titanite ("$BaTiO_3$"). This system was sufficient for inducing stable states of the nanoparticles. This system is a 2-channel programmable voltage regulator which is controlled by Arduino Uno 12 by means of 2 digital-to-analog converters 14 ("DAC") with 12-bit resolution. The voltage can be regulated within 0-24V range.

The Arduino 12 sends 12-bit code signals to the DACs 14, which then "straighten" the signal from a series of pulses to a specific analog-like waveform. Then, operational amplifiers 16 take the signal from the DACs 14 and form the same shape but with supplied voltage from a DC power source. The circuitry of the system is basically a combination of 2 non-inverting amplification circuits 16 based on low power operational amplifiers where each of them is fed by the Arduino 12 through the DACs 14.

The main drawback of this system is that the output voltage is constrained by nominal values of the operational amplifiers and 24V power source. What is desired is a voltage level of a programmable power supply around 1 kV with output frequencies close to MHz range. Such a system would advantageously be programmable to allow generation of a square wave of various frequencies, and directions of the field should be possible to change orthogonally. Further, it is desirable to have the waveform interrupted during the application from one direction and continue from a different direction without much amplitude loss. What is also desired is a system with 1 output channel with 4 output pins, each of which is programmably controlled. Further it is desired that the new system be able to connect high voltage or ground from the output channel to any desired output pin. It is desired that the system be compatible with experimental "capacitor-like" samples useful in synchrotron experiments.

It is also desired that a programmable high voltage source be capable of function generation in the kHz range that can be used at the modern 3rd and 4th generation synchrotron radiation facilities and ultrafast laboratory laser systems.

SUMMARY

According to a first embodiment of the present technology, a high-voltage power supply system including a high-voltage regulator, a function generator, and a triggering circuit is provided. The high-voltage regulator includes a microcontroller, a digital-to-analog convertor in communication with the microcontroller, and a high-voltage DC-DC converter in communication with the digital-to-analog converter. The function generator includes a high-voltage inverter including one or more MOSFET switches. The high-voltage inverter is in communication with the microcontroller of the high-voltage regulator. The triggering circuit includes one or more high-voltage electromechanical switches.

In some embodiments, the high-voltage DC-DC converter has a maximum voltage output of approximately 1000 V.

In some embodiments, the function generator further includes two digital pins connected to the microcontroller, and one or more high-voltage MOSFET switches.

In some embodiments, the triggering circuit further includes one or more reed relay switches, at least one NOR, and at least one Darlington array.

In some embodiments, the triggering circuit further includes an output channel having a plurality of output pins.

In some embodiments, the system further includes a cartridge including a plurality of electrical plates and a socket having a plurality of pins. The plurality of electrical plates are in communication with the plurality of output pins of the triggering circuit.

In some embodiments, the socket of the cartridge has two pins. In other embodiments, the socket of the cartridge has four pins.

In some embodiments, the system further includes a multiferroic material sample positioned in the socket of the cartridge. In some embodiments, the multiferroic material sample includes ferroelectric $BaTiO_3$ nanopowder.

In some embodiments, the system further includes a computing device configured to communicate operation commands to the microcontroller of the high-voltage regulator.

According to another embodiment of the present technology, a method for providing a high-voltage power supply is provided. The method includes communicating a first control code from a microcontroller to a digital-to-analog converter; generating a programmable high voltage via a high-voltage DC-DC converter in communication with the digital-to-analog converter; transmitting the programmable high voltage to a function generator; communicating a second control code from the microcontroller to the function generator; generating, via the function generator, a programmable high-voltage square wave; transmitting the programmable high voltage square wave to a triggering circuit; communicating a third control code from the microcontroller to the triggering circuit; and operating one or more electromechanical switches of the triggering circuit to transmit the programmable high-voltage square wave to one or more of a plurality of output pins of the triggering circuit.

In some embodiments, the method further includes communicating an initialization code from a computer device to the microcontroller.

In some embodiments, the high-voltage DC-DC converter has a maximum voltage output of approximately 1000 V.

In some embodiments, the function generator includes two digital pins connected to the microcontroller, a high-voltage inverter, and one or more high-voltage MOSFET switches.

In some embodiments, the triggering circuit further includes one or more reed relay switches, at least one NOR, and at least one Darlington array.

In some embodiments, the method further includes transmitting the programmable high-voltage square wave to a cartridge including a plurality of electrical plates and a socket. The plurality of electrical plates are in communication with the plurality of output pins of the triggering circuit.

In some embodiments, the method further includes transmitting the programmable high-voltage square wave to a multiferroic material sample positioned in the socket of the cartridge. In some embodiments, the multiferroic material sample includes ferroelectric $BaTiO_3$ nanopowder.

According to an alternative embodiment of the present technology, a thermal stage system is provided. The system includes a chamber having an inlet port for a first fluid and an outlet port for the first fluid; a cartridge positioned inside the chamber, the cartridge including a plurality of electrical plates and a socket having a plurality of pins; a multiferroic material positioned in the socket of the cartridge; a conduit at least partially surrounding the cartridge inside the chamber, the conduit housing a second fluid; and a high-voltage source. The high-voltage source includes a high-voltage regulator, a function generator, and a triggering circuit. The high-voltage regulator includes a microcontroller, a digital-to-analog converter component in communication with the microcontroller, and a high-voltage DC-DC converter in communication with the digital-to-analog converter. The function generator includes a high-voltage inverter including one or more MOSFET switches, wherein the high-voltage inverter is in communication with the microcontroller of the high-voltage regulator. The triggering circuit includes one or more high-voltage electromechanical switches and a plurality of output pins in communication with the plurality of electrical plates of the cartridge.

In some embodiments, the first fluid is nitrogen gas and the second fluid is liquid nitrogen.

Further objects, aspects, features, and embodiments of the present technology will be apparent from the drawing figures and below description.

DETAILED DESCRIPTION

Figure 1:
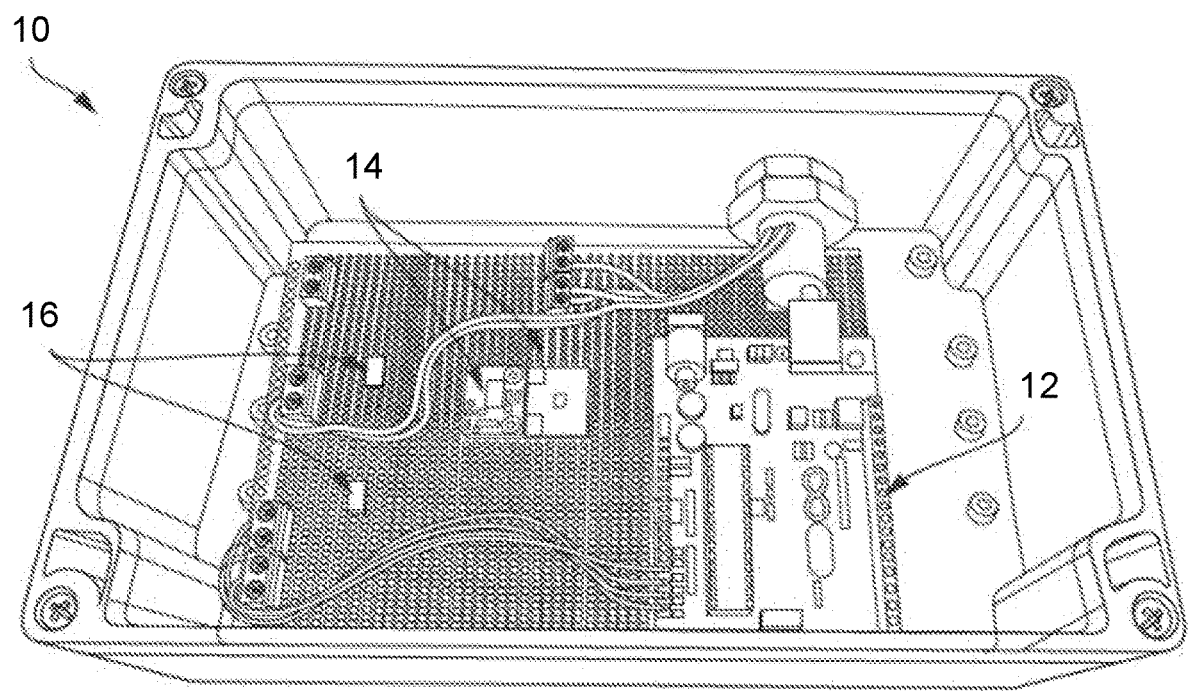
FIG. 1 is a top perspective view of a prior art electric field system.
Figure 2A:
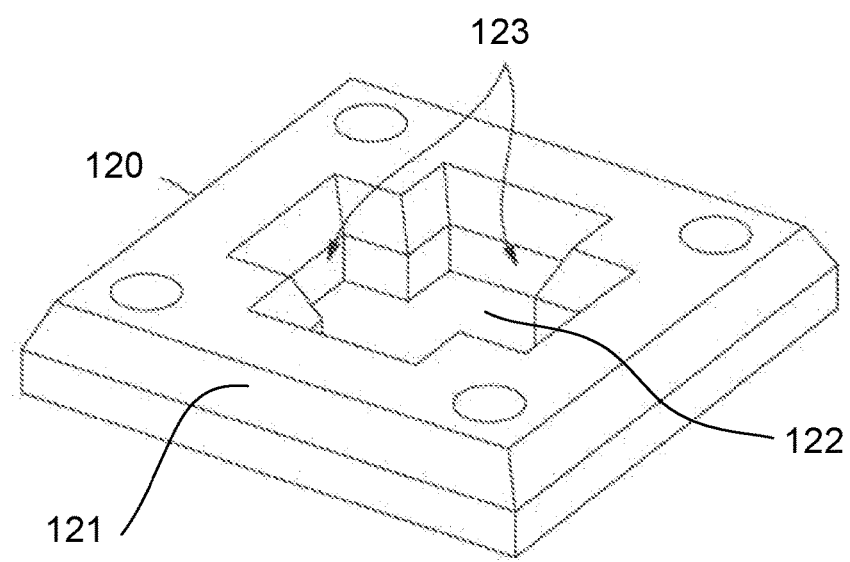
FIG. 2A is a top perspective view of a capacitor-like sample cartridge according to an embodiment of the present technology.
Figure 2B:
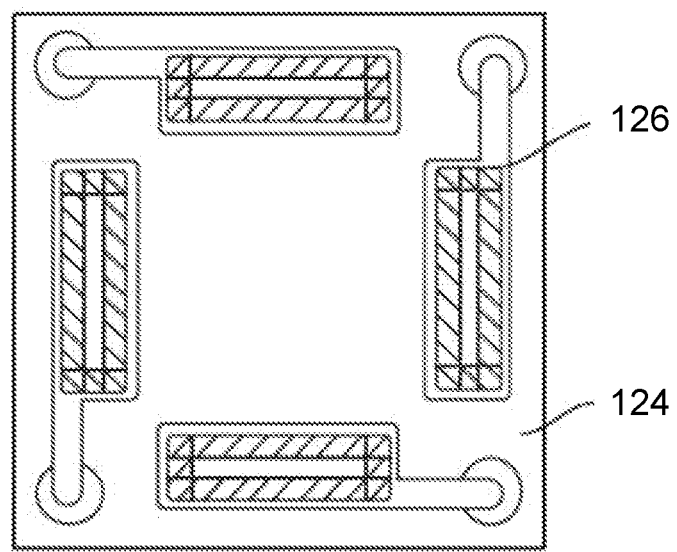
FIG. 2B is a bottom plan view of the cartridge of FIG. 2A.
Figure 2C:
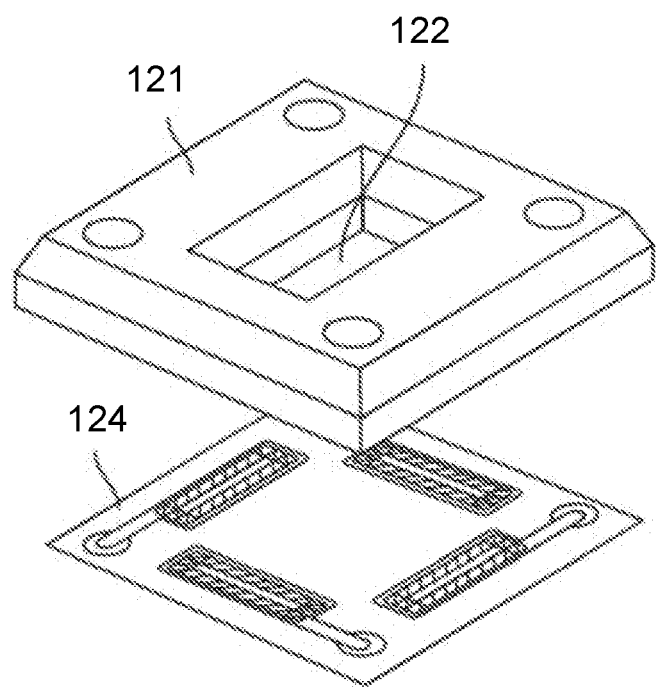
FIG. 2C is an exploded view of a capacitor-like sample cartridge according to an embodiment of the present technology.

FIGS. 2A-2C show embodiments of "capacitor-like" sample cartridges 120. Cartridge 120 has a top lid 121 having a socket 122. In some embodiments, the socket 122 has 4 pins 123, as shown in FIG. 2A. In some embodiments, the socket 122 has 2 pins 123, as shown in FIG. 2C. In some embodiments, the pins 123 are conductive. Cartridge 120 has a bottom circuit board 124. In some embodiments, the bottom board 124 has copper strips that are conductive and serve as the 4 electrical plates 126 of the capacitor, as shown in FIG. 2B. In some embodiments, electrical plates 126 are connected to programmable output pins of an electric-field system. Preferably, the electric-field system includes a power control circuit to regulate voltage, a high-voltage output, and a triggering circuit board having a plurality of output pins connected to the electrical plates 126 of the cartridge 120 for transferring the high-voltage to the cartridge 120.

Figure 3:
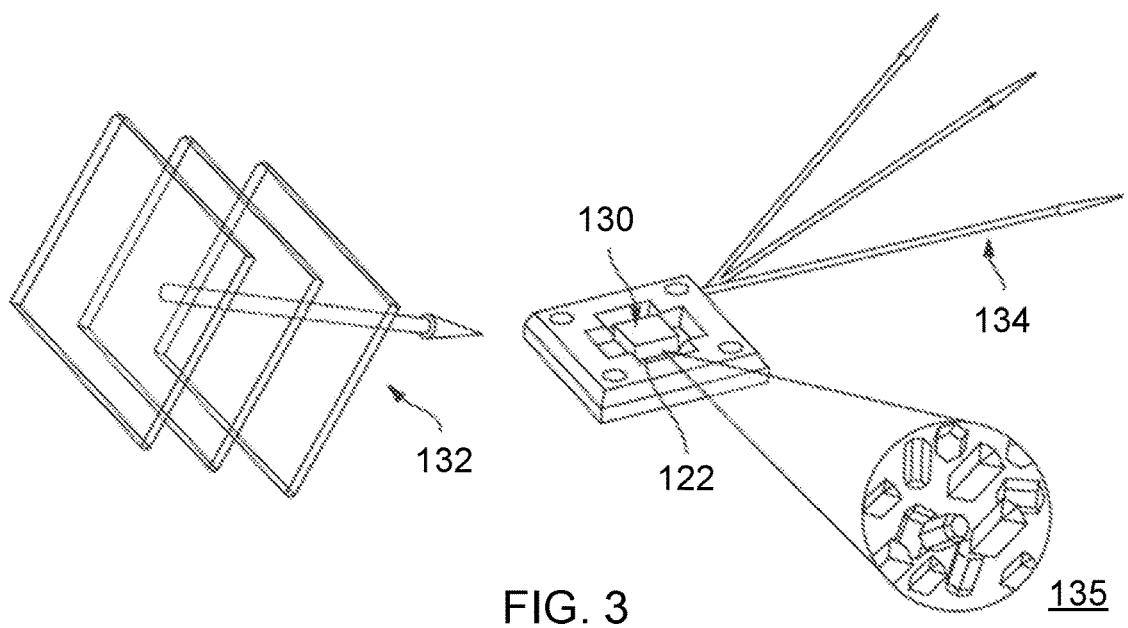
FIG. 3 is a schematic view of the cartridge of FIG. 2A showing the incident and diffracted energy from a sample according to an embodiment of the present technology.

Preferably, a sample 130 is placed in the socket 122, as shown in FIG. 3. In some embodiments, while the sample 130 is retained in the socket 122, the sample 130 is exposed to incident X-ray beams 132 such that diffracted light 134 from the sample 130 can be observed and measured. In some embodiments, the sample 130 is a multiferroic material. In some embodiments, the sample 130 is formed of a nanopowder and epoxy, as shown in detail section 135 of FIG. 3. In some embodiments, the nanopowder is formed of ferroelectric $BaTiO_3$.

Figure 4:
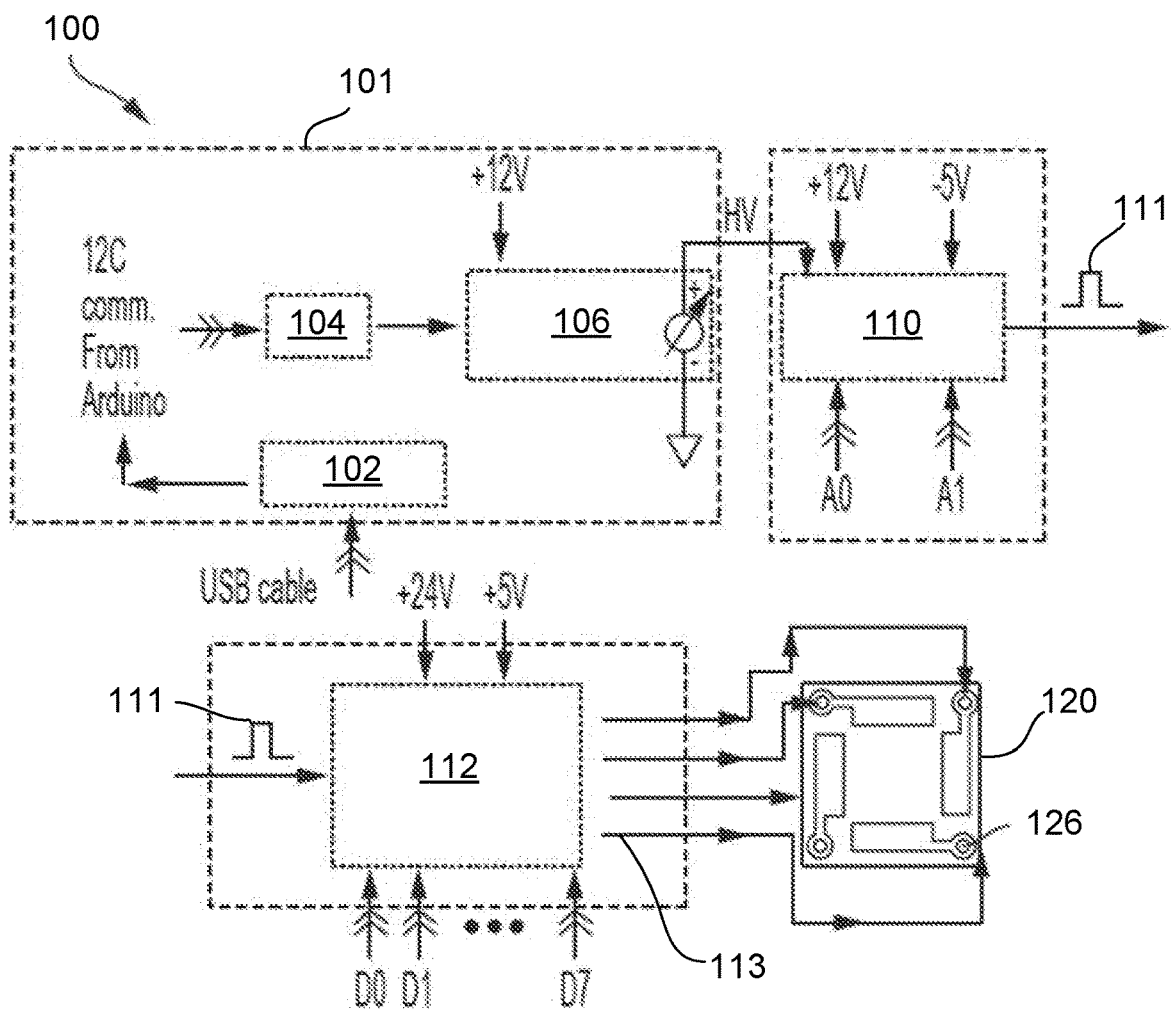
FIG. 4 is a block diagram of a high-voltage source according to an embodiment of the present technology.

FIG. 4 shows a hardware block diagram of a high-voltage source 100 according to an embodiment of the present technology. In some embodiments, high-voltage source 100 includes a high-voltage regulator 101, a function generator 110, and a triggering circuit 112. In some embodiments, high-voltage regulator 101 includes a high-voltage DC-DC converter 106 in communication with peripheral devices such as a digital-to-analog Converter ("DAC") 104 and a microcontroller 102 that are used for adjusting the output voltage of the system in a programmable way. In some embodiments, microcontroller 102 is an Arduino Uno board. Other embodiments use different microcontrollers. In some embodiments, the microcontroller 102 connects to a computing device via USB cable, which powers the microcontroller 102 and sends all the operation commands. In some embodiments, the DAC 104 then receives 12-bit code sent from the microcontroller 102 via I2C channel and sets the output voltage of the high-voltage DC-DC converter 106 to a desirable level. In some embodiments, the high-voltage DC-DC converter 106 has a maximum voltage of approximately 1000 V. Preferably, both the DAC 104 and the high-voltage DC-DC converter 106 have linear output characteristic such that if a user sets the DAC 104 voltage to 50% of the maximum (e.g., 2.5 V) then the DC-DC converter 106 will also set its voltage to 50% of its maximum (e.g., 500 V).

In some embodiments, the function generator 110 is a high voltage inverter that has many high voltage electronic components, such as MOSFET switches. Preferably, the function generator 110 generates a square wave 111 of desirable frequency out of the high-voltage stable signal from the DC-DC converter 106. In some embodiments, the square wave 111 is in the kHz frequency range. In some embodiments, the function generator 110 requires additional voltage sources (e.g., 12V and ±5V) for supplying protection logic gates and turning on and off high-voltage MOSFET switches that are involved in circuit. In some embodiments, programmable control of the output square wave 111 is implemented via two digital pins A0-A1 that are connected to the microcontroller 102.

In some embodiments, the triggering circuit 112 is used to connect a square wave 111 generated by the function generator 110, or a stable high-voltage signal from the DC-DC converter 106, to any of four output pins 113. In some embodiments, the output pins 113 are connected to the electrical plates 126 of the cartridge 120. In some embodiments, the triggering circuit 112 includes high-voltage electromechanical switches, such as normally open reed relay switches. In some embodiments, the triggering circuit 112 also has protection logic for safety, which is preferably implemented via NOR and Darlington arrays chips. In some embodiments, the triggering circuit 112 is divided into two equivalent, nearly equivalent, or similar circuits such that all components of the triggering circuit 112 fit in a housing box.

Figure 5:
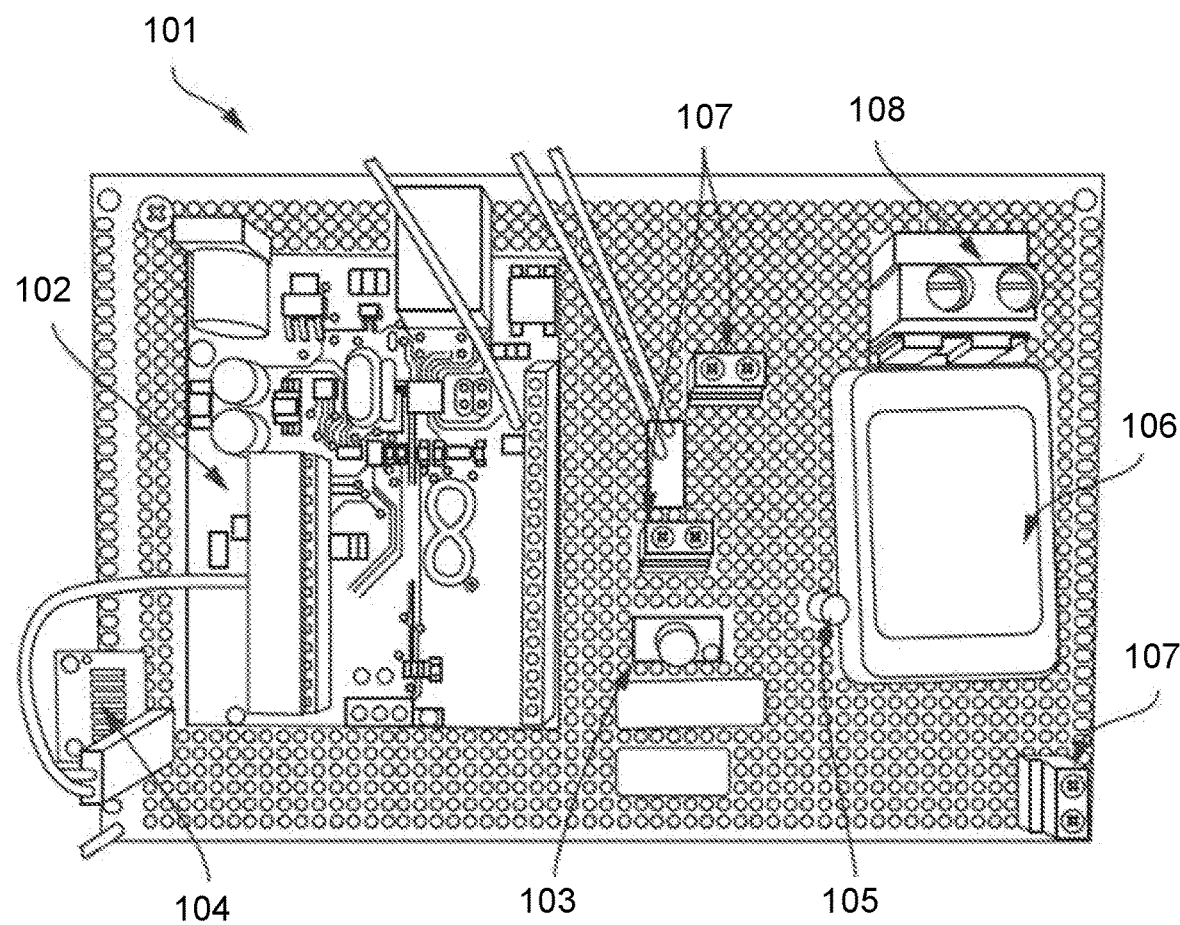
FIG. 5 is a top plan view of a high-voltage regulator according to an embodiment of the present technology.

An exemplary embodiment of a high-voltage regulator 101 is shown in FIG. 5. Microcontroller 102 is in communication with DAC 104 and high-voltage DC-DC converter 106. High-voltage DC-DC converter 106 includes a high-voltage output terminal 108. In some embodiments, the high-voltage regulator 101 includes one or more input/output terminals 107. In some embodiments, the high-voltage regulator 101 includes a power switch 103 for toggling power to the system on and off, and a power indicator 105. In some embodiments, the power indicator 105 is a light source, such as a green LED.

Figure 6A:
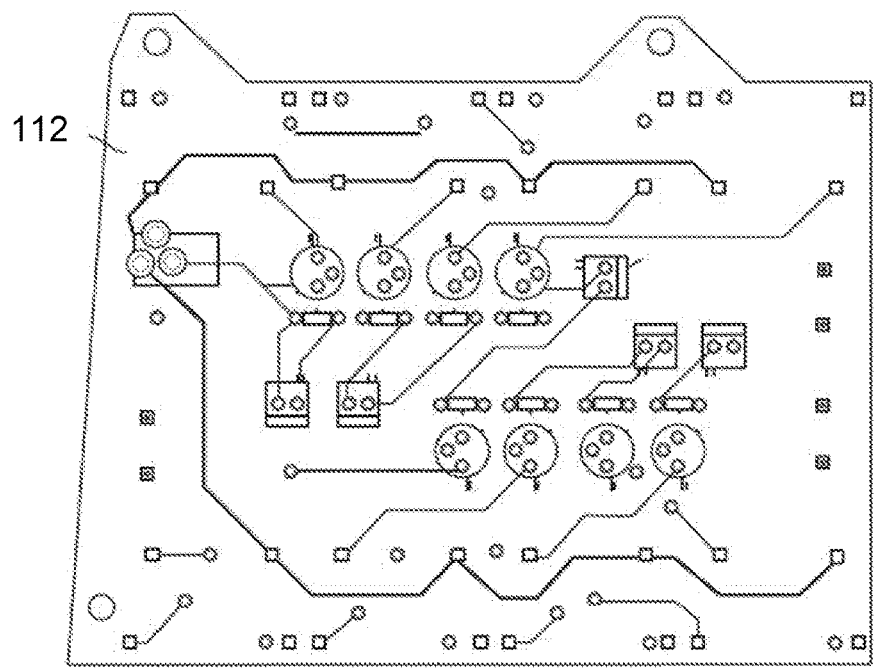
FIG. 6A is a top plan view of a triggering circuit printed circuit board ("PCB") according to an embodiment of the present technology.
Figure 6B:
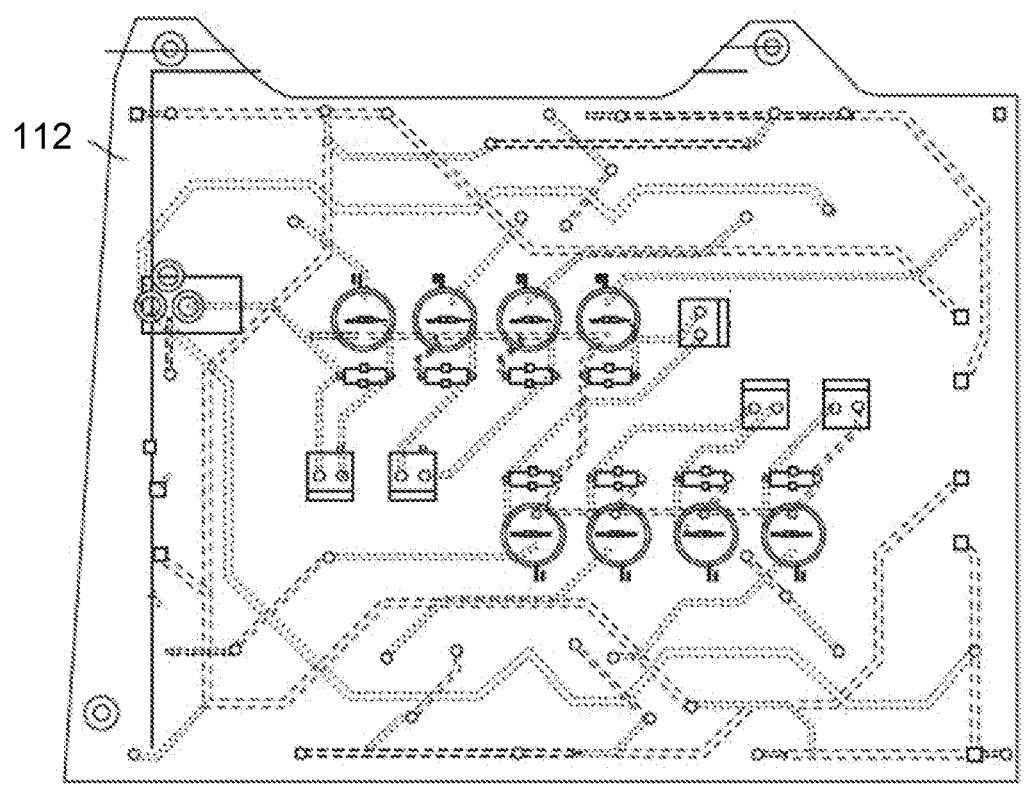
FIG. 6B is a layout view of the triggering circuit PCB of FIG. 6A.
Figure 7:
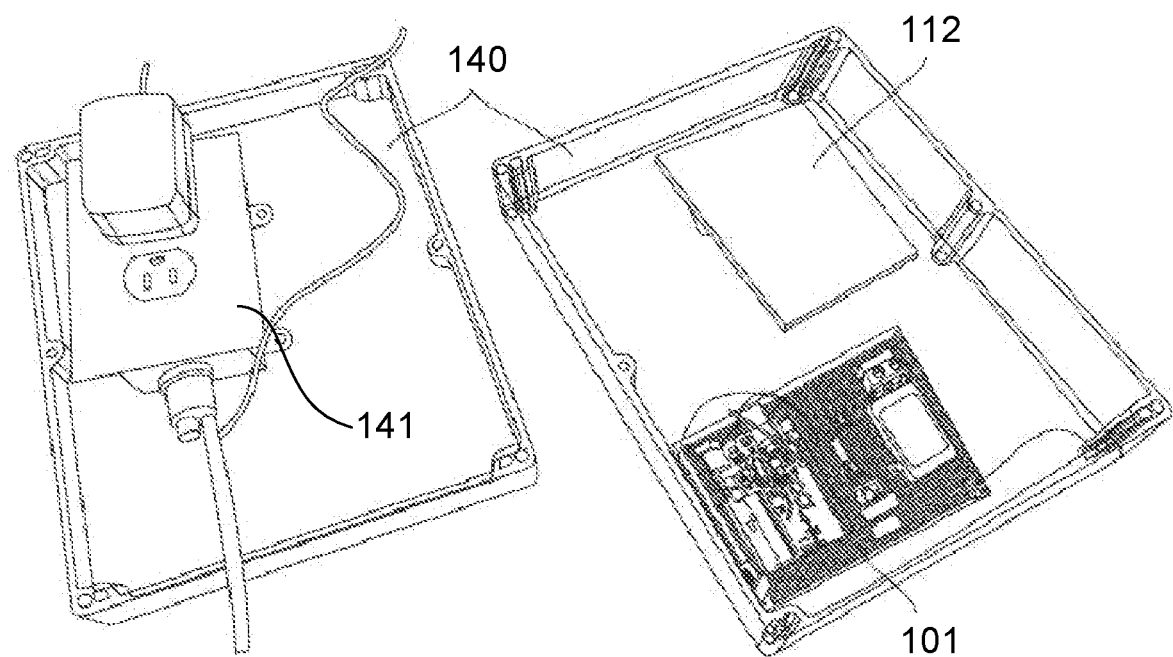
FIG. 7 is a top perspective view of an electric field system according to an embodiment of the present technology.

FIG. 6A shows an exemplary triggering circuit 112 according to an embodiment of the present technology. In some embodiments, triggering circuit 112 is a two-layer system. Other embodiments use more layers, up to a seven-layer system, for example. FIG. 6B shows a layout view of the triggering circuit 112 of FIG. 6A. FIG. 7 shows an embodiment of an electric field system having a high-voltage regulator 101 and a triggering circuit 112 inside a housing 140. In some embodiments, the electric field system includes an external power source 141 for supplying the current that the high-voltage DC-DC converter 106 converts into a high-voltage signal.

Figure 8:
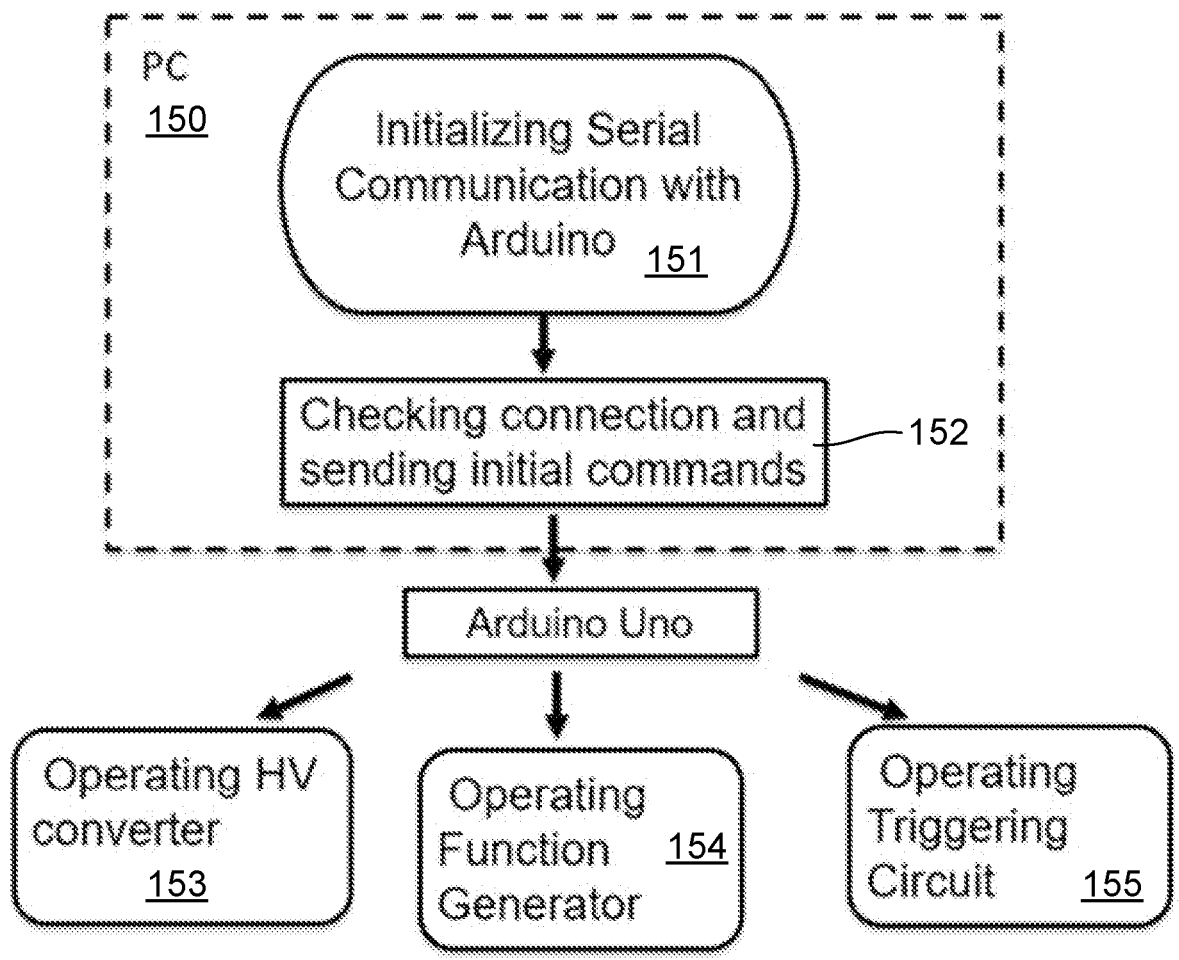
FIG. 8 is a flow chart showing a method of supplying a high-voltage power supply according to an embodiment of the present technology.

FIG. 8 shows a flow chart of a method for operating the high-voltage system 100 according to an embodiment of the present technology. In some embodiments, the system 100 is fully programmable, so a user of the system 100 does not need to interact with the hardware manually for adjusting its output signals. In some embodiments, the software of the system 100 is implemented in such a way that a user operates the system 100 from a computing device 150, such as a desktop computer, laptop computer, tablet, mobile phone, personal digital assistant, etc. In some embodiments, operational commands from computing device 150 are sent through a serial communication via USB cable connected to microcontroller 102 (e.g., an Arduino Uno board), which then generates corresponding output signals that controls the system 100. In some embodiments, the computing device 150 sends operational commands to the microcontroller 102 through a wireless connection, such as WiFi, Bluetooth, etc. In some embodiments, the system 100 uses the Python software code language. In some embodiments, the system 100 uses the Arduino software code language. In other embodiments, the system 100 uses both Python and Arduino software code languages. Exemplary source code for both Python and Arduino software code languages used in embodiments of the present technology is shown in U.S. Provisional Patent Application No. 62/932,569, the contents of which are incorporated herein in its entirety.

In some embodiments, the method is divided into two major blocks. In the first major block of the embodiment shown in FIG. 8, the computing device 150 at step 151 initializes a serial communication with the microcontroller 102 to send operational command code to microcontroller 102. At step 152, the computing device 150 checks the connection to microcontroller 102 and sends initializing command code to microcontroller 102. Preferably, this code initializes the system and sets all the hardware involved into well-known stationary states. For example, in some embodiments, initialization command sets output voltage to 0 V, sets output frequency to 0 Hz, and disconnects all output pins. In some embodiments, this code is implemented in a user-friendly manner such that a user of the system 100 does not need to have programming skills to operate it.

The second major block of the embodiment shown in FIG. 8 is microcontroller 102 parsing code. In some embodiments, this parsing code is the C code that is uploaded to the microcontroller 102 and is configured to receive the serial commands sent from the computing device 150, parse/decode the commands, and then generate corresponding output signals for driving the high-voltage DC-DC converter 106 (step 153), function generator 110 (step 154), and triggering circuit 112 (step 155).

In some embodiments, at step 153, the first hardware block controlled by the microcontroller 102 is the high-voltage DC-DC converter 106 that generates programmable high-voltage of the system 100. In some embodiments, the DC-DC converter 106 is controlled via DAC 104 in communication with the microcontroller 102. In some embodiments, the DAC 104 has I2C communication and 12-bit resolution, which means that the microcontroller 102 must send 12-bit code to DAC 104 for setting its output voltage to a desirable level. Preferably, for sending the 12-bit code to the microcontroller 102, the initialization control code (step 152) first initializes I2C communication with DAC 104. In some embodiments, this is done by means of the <Wire.h> library for Arduino software. In some embodiments, the output pins of DAC 104 are connected to programmable input port of DC-DC converter 106 for high-voltage adjustment. In some embodiments, the output characteristics of DAC 104 and DC-DC converter 106 have perfect linear shapes such that setting the output voltage of DAC 104 to 10% of its maximum voltage also sets the output voltage of DC-DC converter 106 to 10% (e.g., 100V) of its maximum voltage.

In some embodiments, at step 154, the second hardware block controlled by the microcontroller 102 is the function generator 110. First, in some embodiments, the microcontroller 102 code checks whether a user wants to operate the function generator 110 in DC mode. If yes, then the microcontroller 102 preferably connects output of the DC-DC converter 106 directly to the output of the function generator 110. If a user wants to generate a high-voltage square wave 111 of desirable frequency, the microcontroller 102 generates corresponding signals to output square wave 111 from the function generator 110. In some embodiments, the function generator 110 has two digital input pins from the microcontroller 102 and the protection logic of the function generator 110 is configured such that the microcontroller 102 must generate two mutually inverse square waves to generate the output square wave 111. In other words, when the signal on one of the pins is high, the other pin should have a low-level signal. In some embodiments, the easiest way to generate such square waves on Arduino pins is by means of delays. However, in such embodiments, all other functions of the control code are going to be delayed as well, which makes it impossible to talk to other hardware blocks during high-voltage square wave generation. In some embodiments, this problem is addressed by using the internal Arduino Uno timers for generating high-frequency interrupts that can be used for generating two mutually inverse square waves for the function generator 110.

In some embodiments, at step 155, the final hardware block controlled by the microcontroller 102 is the triggering circuit 112. First, in some embodiments, the microcontroller 102 code checks whether a user wants to operate the triggering circuit 112 in DC mode. If yes, then the user is permitted to connect any of desirable output pins 113 to ground, high voltage, or insulate them. If not, then the control code permits the user to connect any of the outputs pins 113 of the system to the output of the function generator 110. In some embodiments, operations on output pins 113 of the system are implemented via high-voltage reed relays. In some embodiments, for turning on and off relays, the microcontroller 102, in accordance to an operation command, generates two logical level (low/high) signals that are sent to the Darlington array of the protection logic of the triggering circuit 112. If the signal is high, then the corresponding Darlington transistor connects one of the input pins of the relay to the ground, allowing the current to flow through the coil of the relay, which then triggers the output of the relay and connects desirable pins to output pins 113 of the system, according to some embodiments.

Figure 9A:
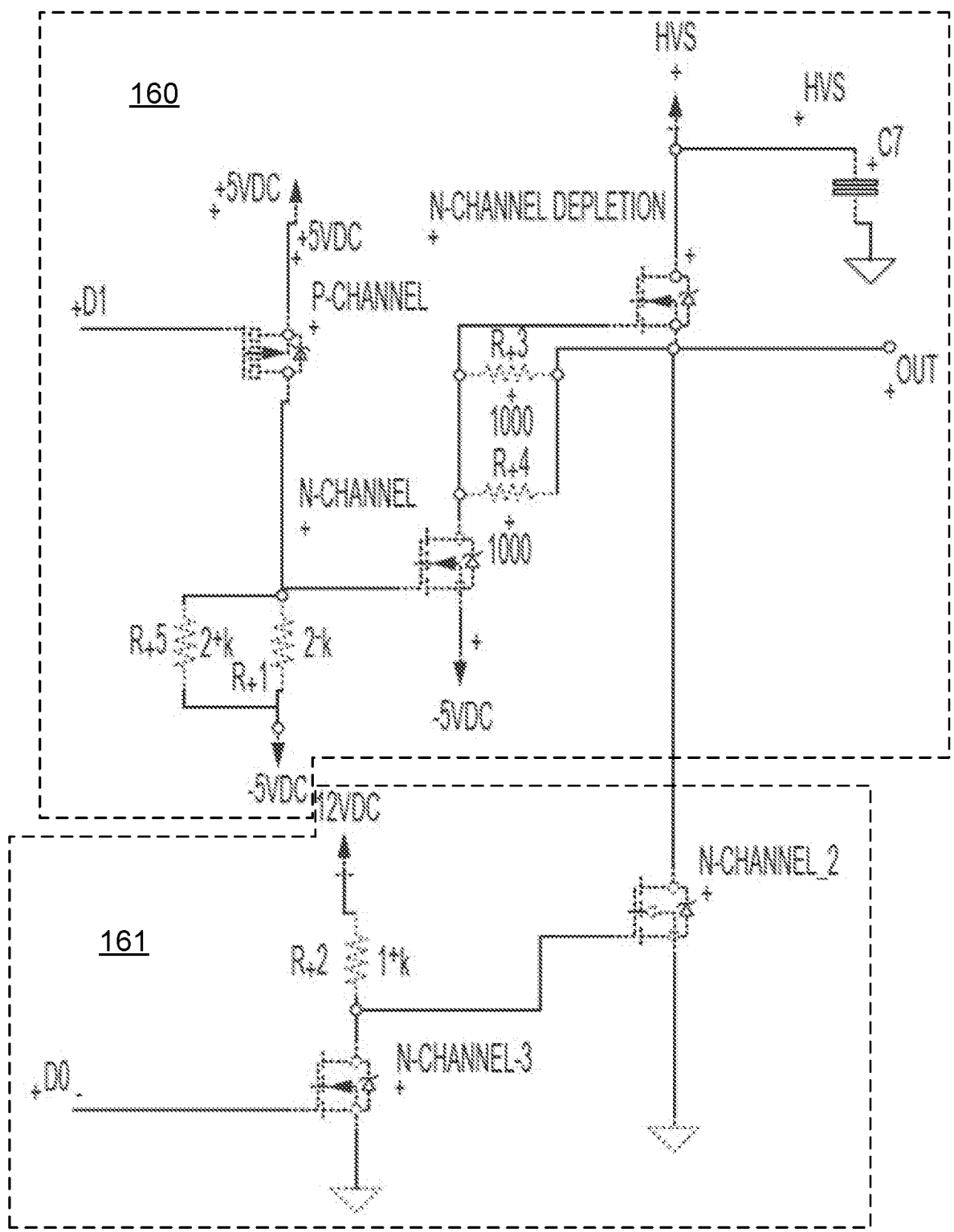
FIGS. 9A-9E are schematic views of the components of a function generator PCB according to an embodiment of the present technology.

FIG. 9A shows a first part of a schematic of the function generator 110 PCB according to an embodiment of the present technology. This circuit consists of two major sections: a high-voltage section 160, and a ground section 161. Digital Pin D1 is the input to the high-voltage section 160, and pin D0 is the input to the ground section 161 of the function generator 110. Output of the circuit is labeled as OUT. In some embodiments, to connect the output to the high voltage that comes from DC-DC converter 106 and labeled as HVS (i.e. high-voltage source), the microcontroller 102 sends high-level signals to D1 and D0. In some embodiments, to connect the output of the function generator 110 to the ground, the microcontroller 102 sends high-level signal to D0 and low-level signal to D1. In such embodiments, P-channel MOSFET switch Q5 connects a +5 V signal to the gate of the high voltage N-channel MOSFET Q2, which in turn connects a −5 V signal to the gate of the Depletion-mode MOSFET Q4. Due to the negative voltage on the gate of Q4, the drain to source channel will close and insulate output of the circuit from the high voltage. At the same time, N-channel MOSFET switch Q3 of the ground section 161 of the circuit preferably has a low-voltage signal on its gate, allowing the 12 V signal to be connected to the gate of Q1 MOSFET. Q1, in turn, under the positive voltage on its gate preferably connects the ground to the output.

Figure 9B:
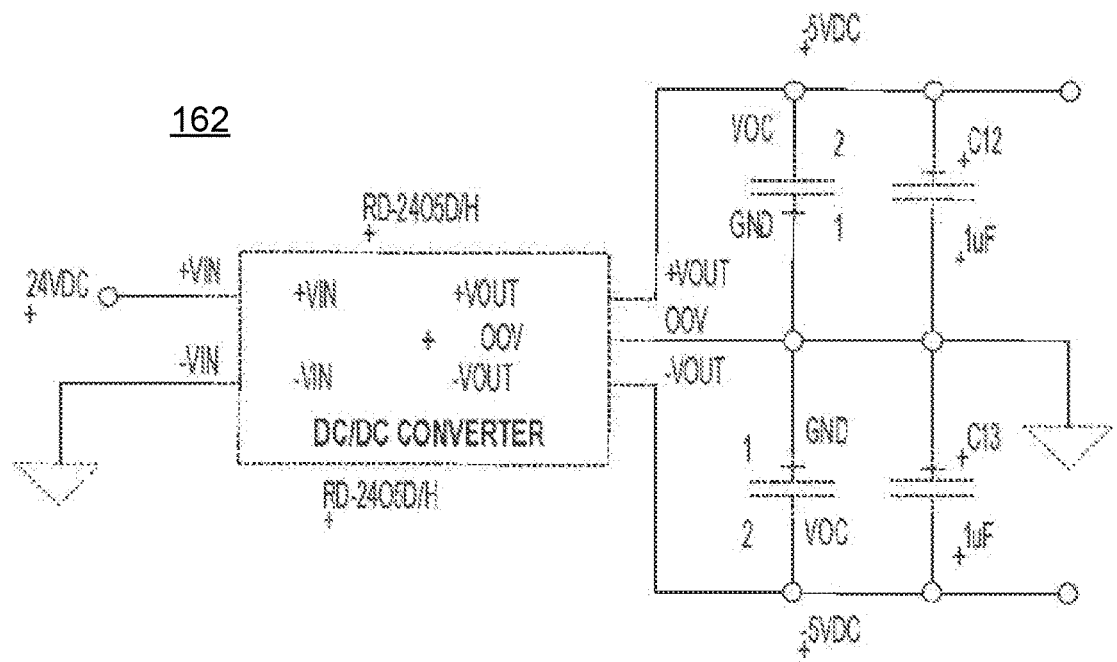
Figure 9C:
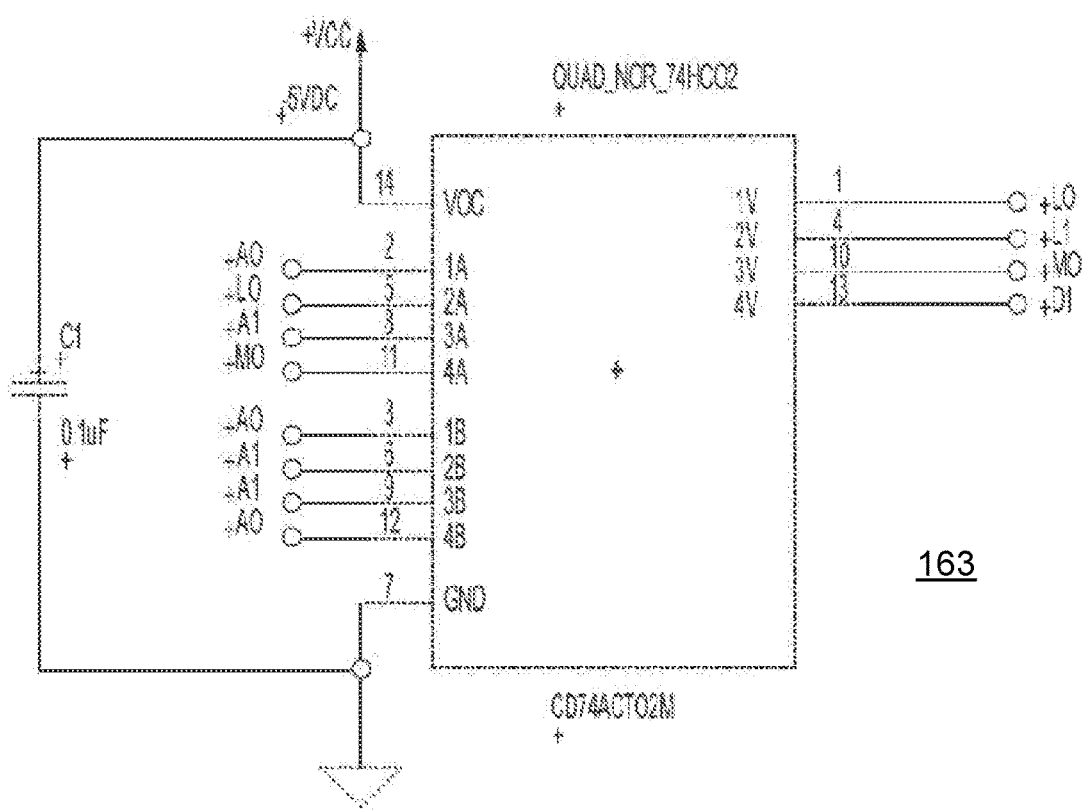
Figure 9D:
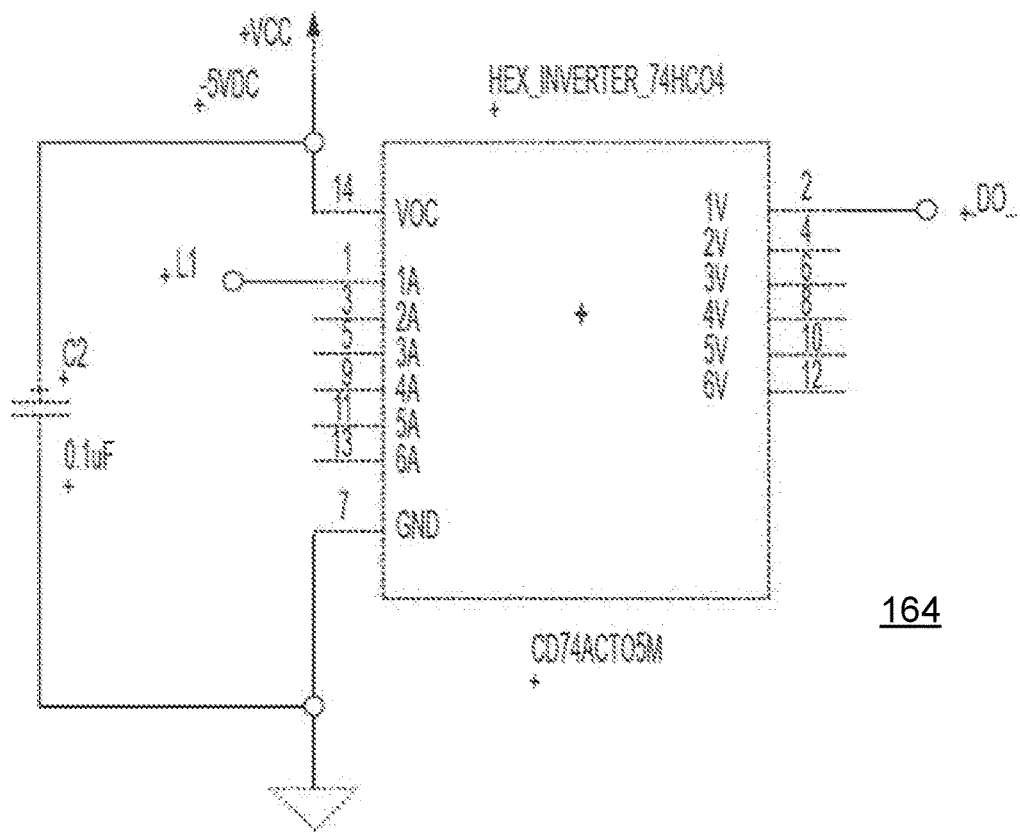
Figure 9E:
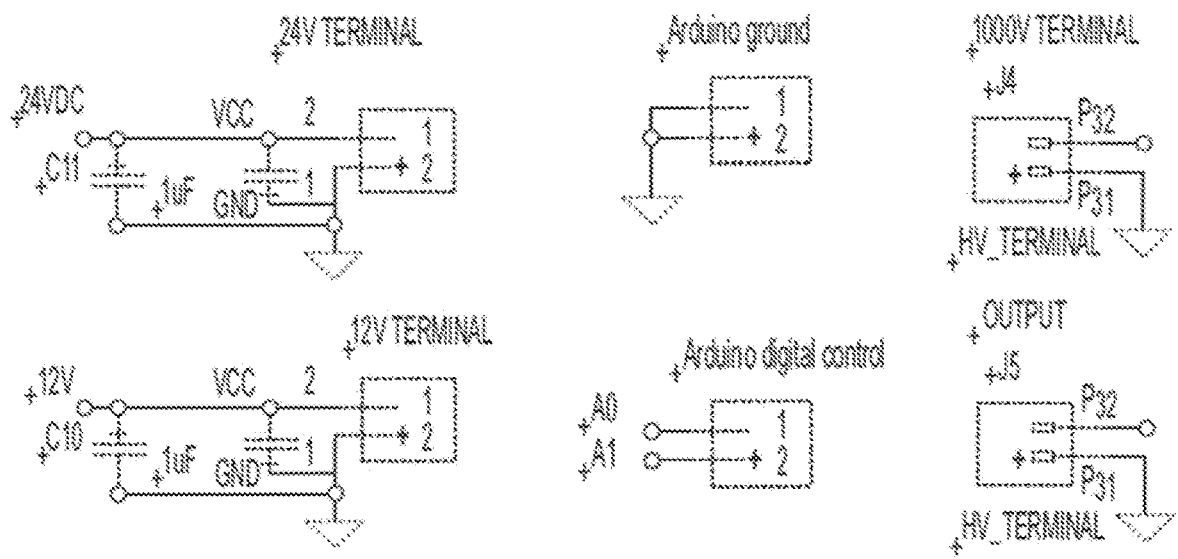

FIGS. 9B-9E shows a second part of a schematic of the function generator 110 PCB according to an embodiment of the present technology. In some embodiments, this part of the schematic for the function generator 110 consists of three main blocks. FIG. 9B shows the first block 162 is a DC-DC converter that generates the ±5 V signals that are involved in the first circuit shown in FIG. 9A. All capacitors shown on this schematic are preferably used as decoupling capacitors. In some embodiments, the second part of this schematic is the input protection logic that includes a Quad NOR chip 163 and a HEX inverter chip 164, as shown in FIGS. 9C-9D. Preferably, this protection logic ensures that the circuit of the function generator 110 will never short the high-voltage signal to the ground. In some embodiments, digital inputs from the microcontroller 102 get connected directly to this protection logic. FIG. 9E shows exemplary input/output terminals that supply the circuit with all signals needed for its operation.

Figure 10A:
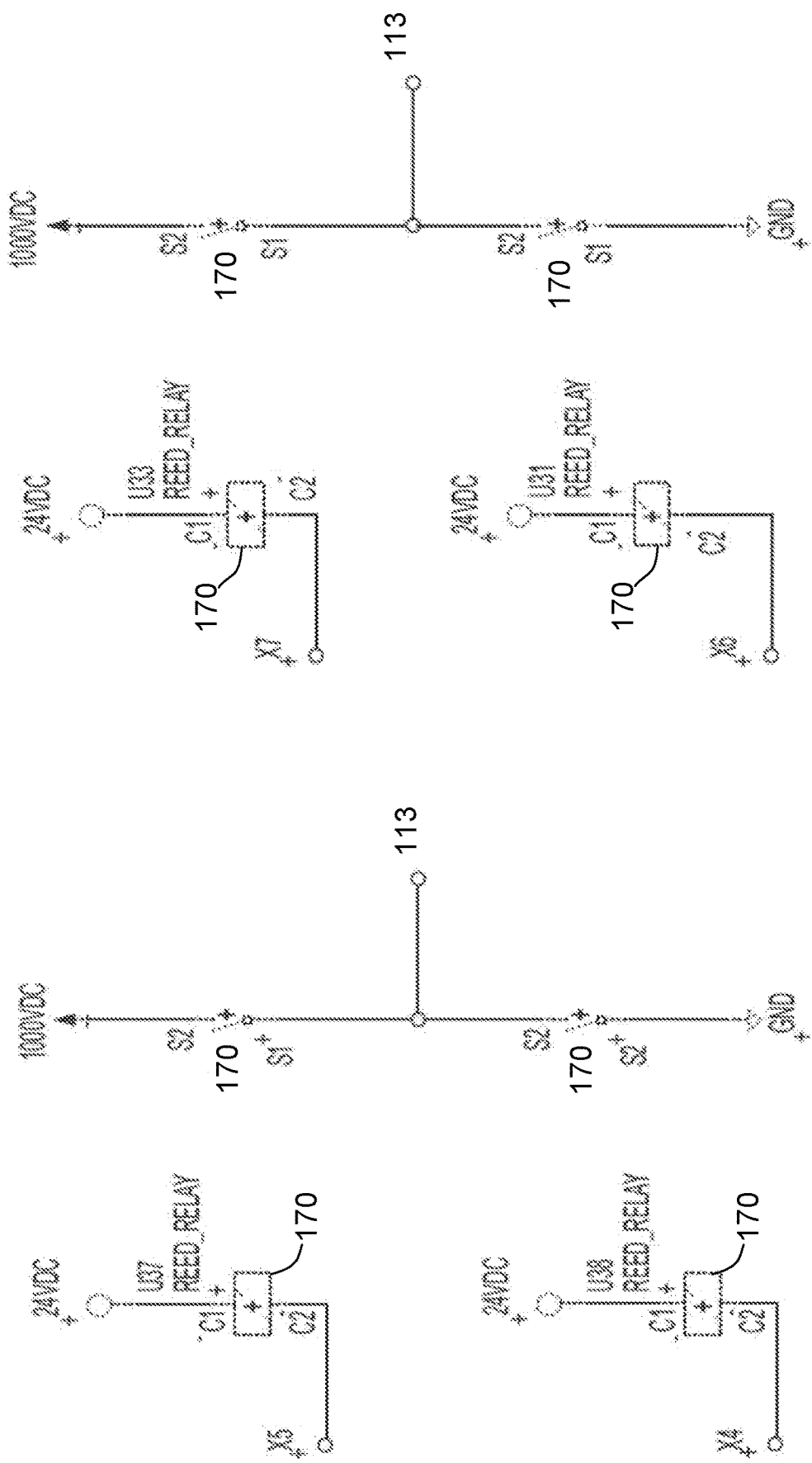
FIGS. 10A-10E are schematic views of the components of a triggering circuit PCB according to an embodiment of the present technology.

FIG. 10A shows a first part of a schematic of a triggering circuit 112 PCB according to an embodiment of the present technology. In some embodiments, the triggering circuit 112 is divided into two circuits that consist of similar components. In some embodiments, the only difference between the two circuits is their respective layouts. Each circuit contains four reed relays 170. In some embodiments, two of the reed relays 170 are connected to the high voltage, and two other reed relays 170 are connected to the ground. Preferably, each pair of the high voltage and ground reed relays 170 form one of the output pins 113 of the system 100.

Figure 10B:
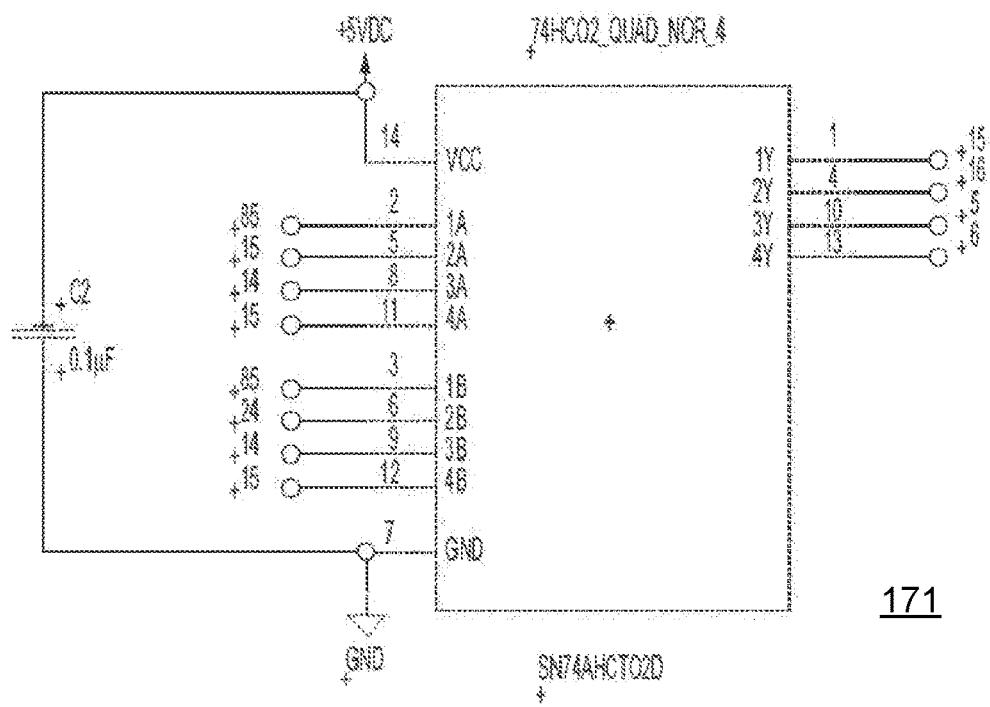
Figure 10C:
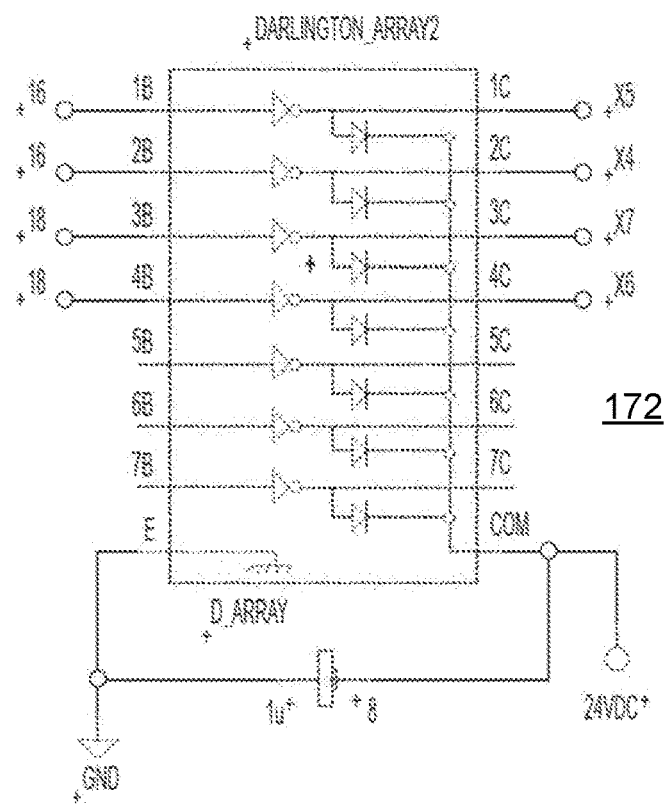
Figure 10D:
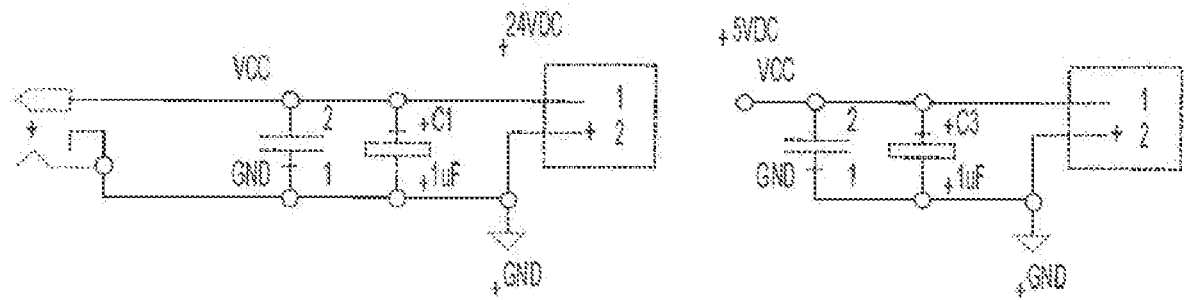
Figure 10E:
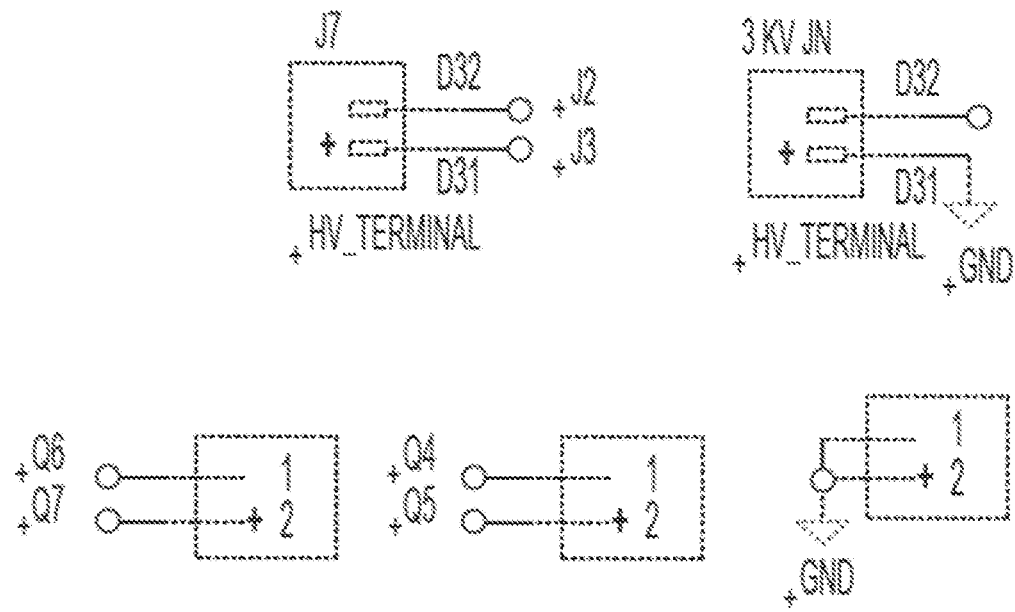

FIGS. 10B-10C show the protection logic of the triggering circuit 112 according to an embodiment of the present technology. In some embodiments, the protection logic for one of the two triggering circuits includes two NOR gates chips 171, and a Darlington array 172. If a user of the system wants to connect an output pin 113 to the ground, then the microcontroller 102 preferably generates corresponding signals by which the input of the ground side reed relay 170 gets connected to the ground through the Darlington array 172, allowing the current to flow through the coil of the relay 170. In this embodiment, the output of the relay 170 connects the ground to the output pin 113 while the high-voltage side relay 170 is disconnected by the protection logic. Preferably, the protection logic prevents triggering of both relays 170 in an output pair, making short circuiting impossible. For connecting an output pin 113 to the high voltage, the microcontroller 102 preferably connects input pin X5 of the corresponding relay 170 to the ground and disconnect ground side relay 170 with the input X4. FIGS. 10D-10E show exemplary input/output terminals for the triggering circuit 112.

Figure 11:
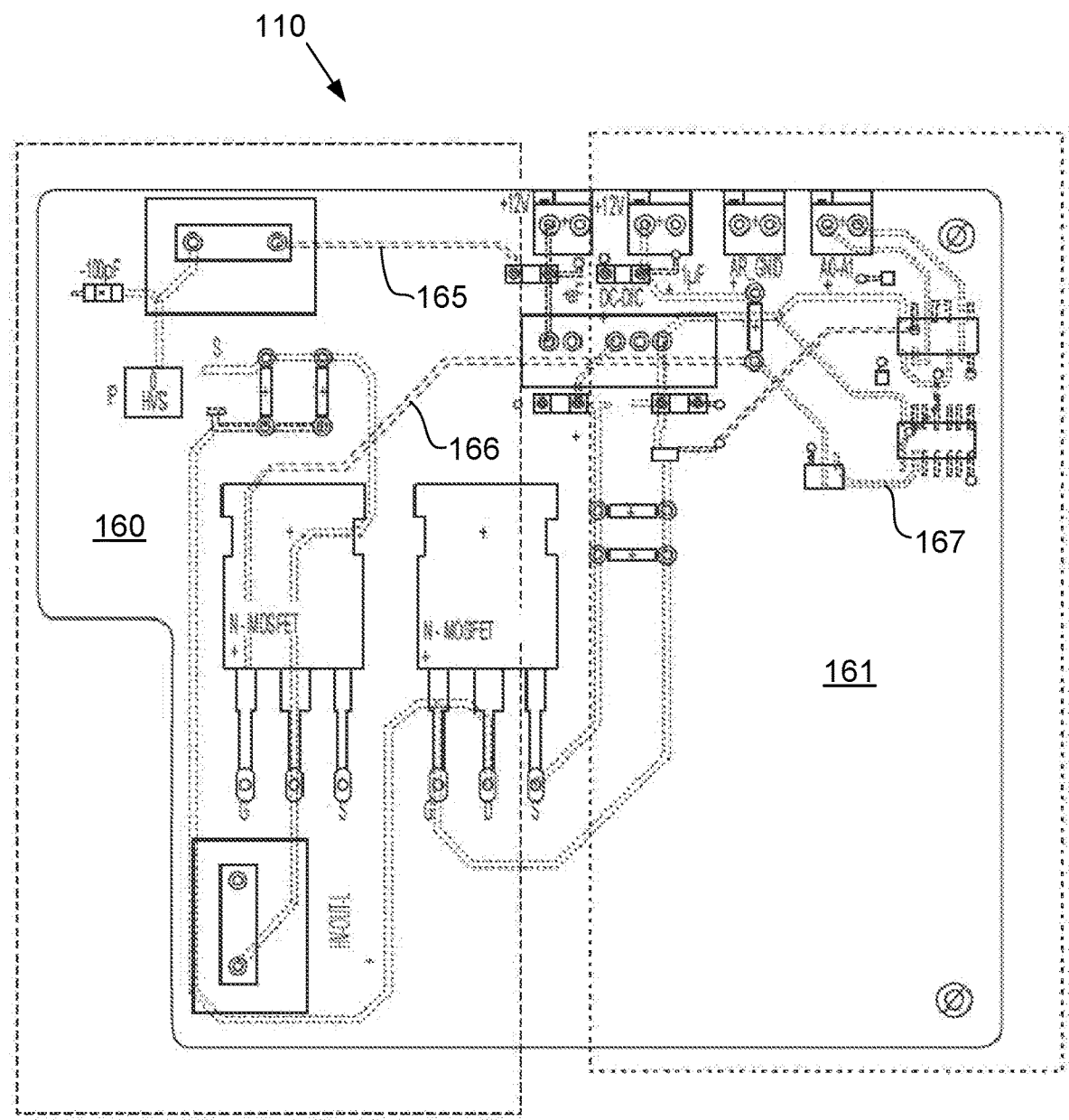
FIG. 11 is a layout view of a function generator PCB according to an embodiment of the present technology.

FIG. 11 shows the layout of a function generator 110 PCB according to an embodiment of the present technology. The layout of this circuit is divided into two sections: high-voltage section 160, and low-voltage section 161. In some embodiments, the high-voltage section 160 contains all high-voltage components, such as MOSFET switches and high-voltage input/output terminals. In some embodiments, high-voltage section 160 has only the bottom ground layer, while the low-voltage section 161 has both ground layers. In some embodiments, grounds of both sections 160/161 of the circuit are connected through a wire 165. As shown, power wires 166 in this layout are wider than digital signals wires 167. In some embodiments, the low-voltage section 161 contains all other electronic components involved in the circuit, such as DC-DC converter, protection logic, decoupling capacitors, low voltage MOSFETs, and input terminal blocks. In some embodiments, the function generator 110 PCB has a custom, non-standard shape to accommodate the dimensions of a housing box 140.

Figure 12:
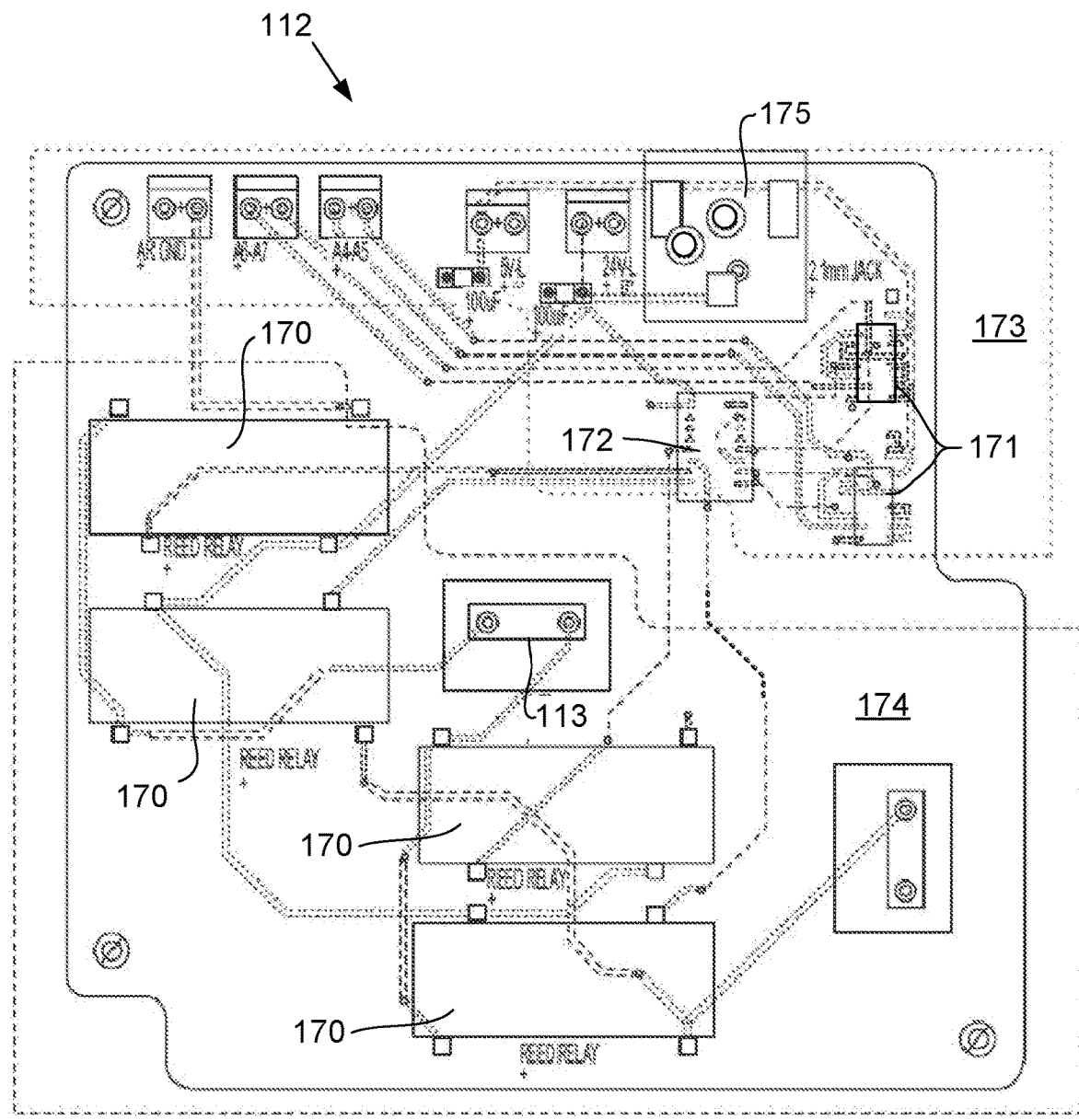
FIG. 12 is a layout view of a first trigger circuit PCB according to an embodiment of the present technology.

FIG. 12 shows the layout of a first triggering circuit 112 PCB according to an embodiment of the present technology. As in the function generator 110 circuit, the layout of this board is divided into a low-voltage section 173, and a high-voltage section 174. The high-voltage section 174 preferably contains all high-voltage reed relays 170 and input/output terminals. The low-voltage section 173 preferably contains low-voltage components, such as 2.1 mm female adapter 175, input terminals, protection logic (NOR gate chips 171 and Darlington array 172), and decoupling capacitors. The ground layers of both sides are connected in the same manner is in the function generator 110 circuit described above. Preferably, all routing between components has appropriate separation distance and insulation, considering the high voltage in this embodiment.

Figure 13:
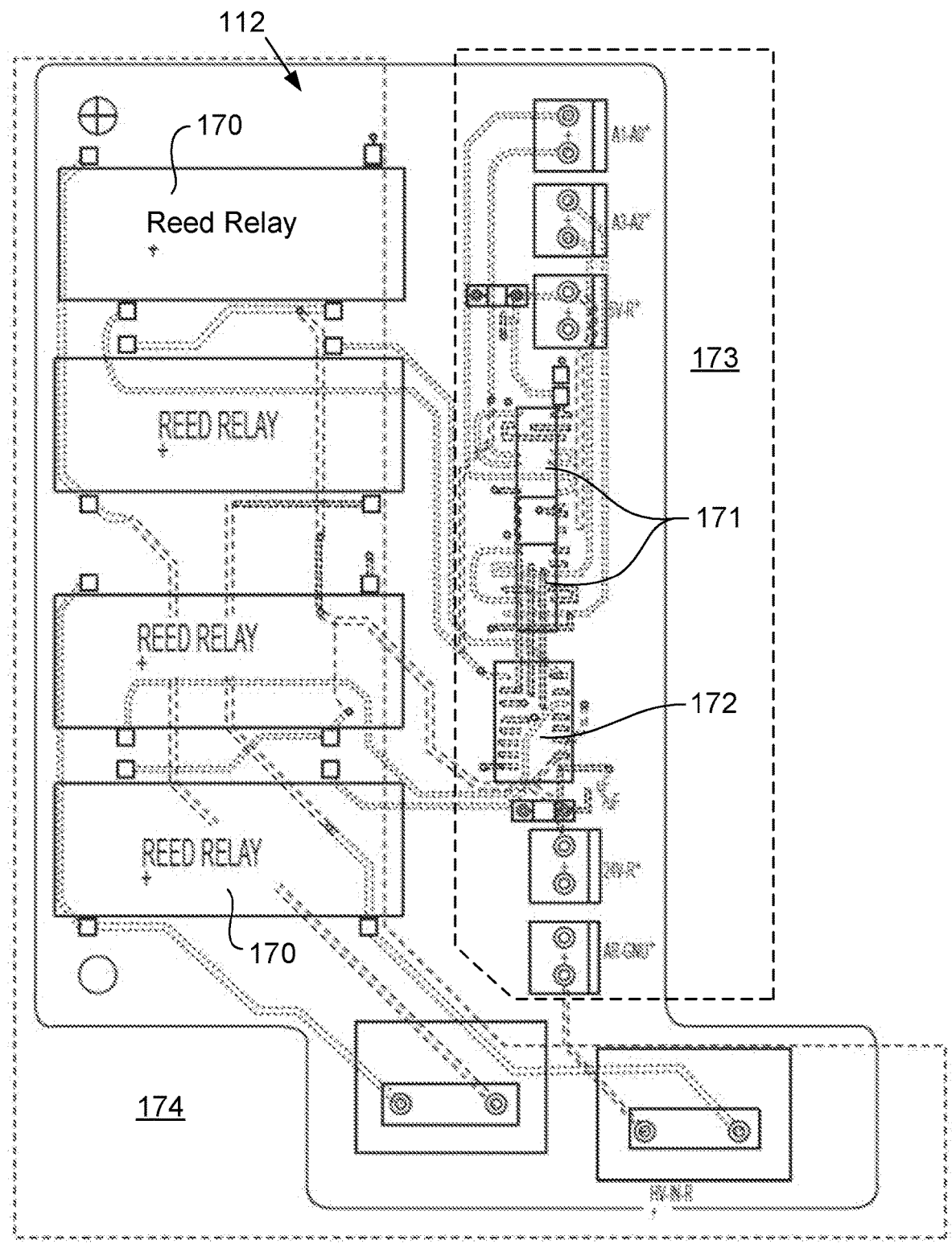
FIG. 13 is a layout view of a second trigger circuit PCB according to an embodiment of the present technology.

FIG. 13 shows the layout of a second triggering circuit 112 PCB according to an embodiment of the present technology. This circuit is also divided into a low-voltage section 173 and a high-voltage section 174. The layout for this board was implemented in the same way as for the first triggering circuit 112 PCB described above: the high-voltage section 174 has only the bottom ground layer, both ground layers are connected via a ground wire, and the high-voltage routes have approximately a 0.1 inch separation for safety. In some embodiments, this board has smaller physical dimensions than the first triggering circuit 112 PCB. In some embodiments, the second triggering circuit was implemented on a small-size board, considering all safety and circuitry requirements.

Figure 14:
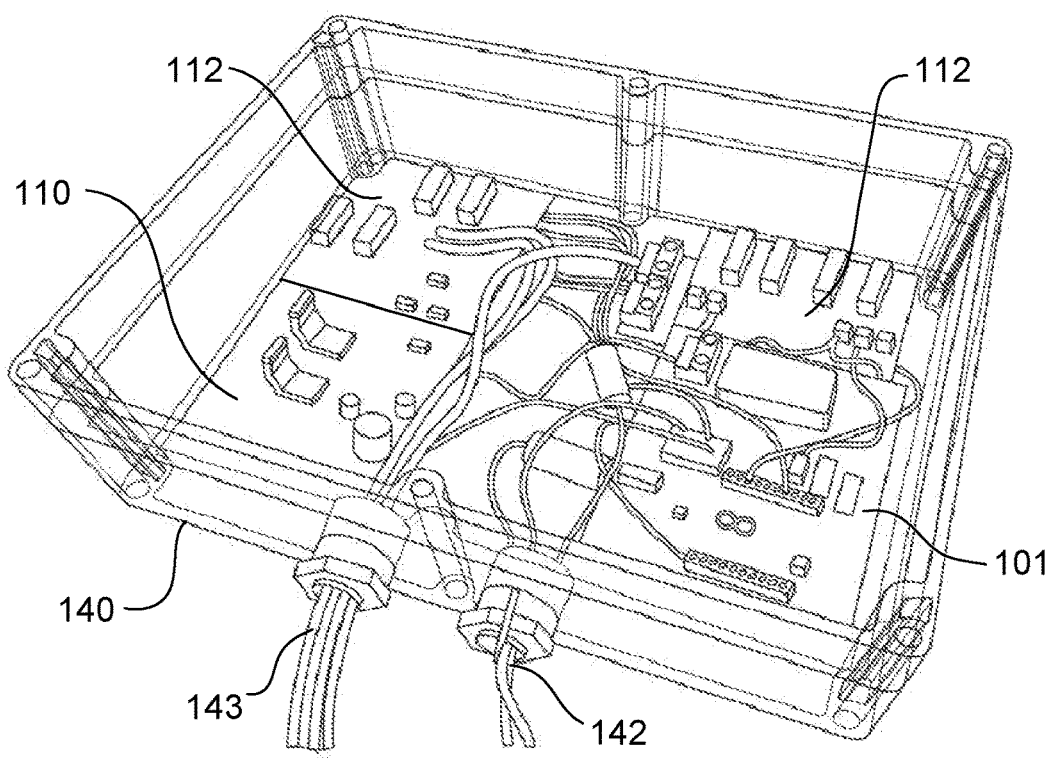
FIG. 14 is a top perspective view of a high-voltage power supply system according to an embodiment of the present technology.

FIG. 14 shows the assembled high-voltage power supply system 100 according to an embodiment of the present technology. In some embodiments, the high-voltage regulator 101, the function generator 110, and the triggering circuit 112 are connected and positioned in a housing box 140. In some embodiments, the system 100 includes the first trigger circuit 112 and the second triggering circuit 112, as described above. In some embodiments, the system 100 includes power supply wires 142 for powering the system 100 and supplying the current that the high-voltage converter 106 converts into the high-voltage signal. In some embodiments, the system 100 includes power output wires 143 for connecting the output pins 113 of the triggering circuit 112 to, and supplying high-voltage power to, an external component, such as the capacitor-like sample cartridge 120 described above. Preferably, the dimensions of the PCBs match the dimensions of the housing box 140 for a secure fit. In some embodiments, high-voltage wires are used in the system 100. For example, in some embodiments, all connections between PCB boards are done by means of high-voltage wires and regular 3.5 mm terminals. In some embodiments, the housing box 140 is designed specifically for the electrical circuits and PCBs and it has mounting bosses for circuit attachment. In some embodiments, the PCBs are fastened to the housing box 140 via, for example, mounting screws.

Figure 15:
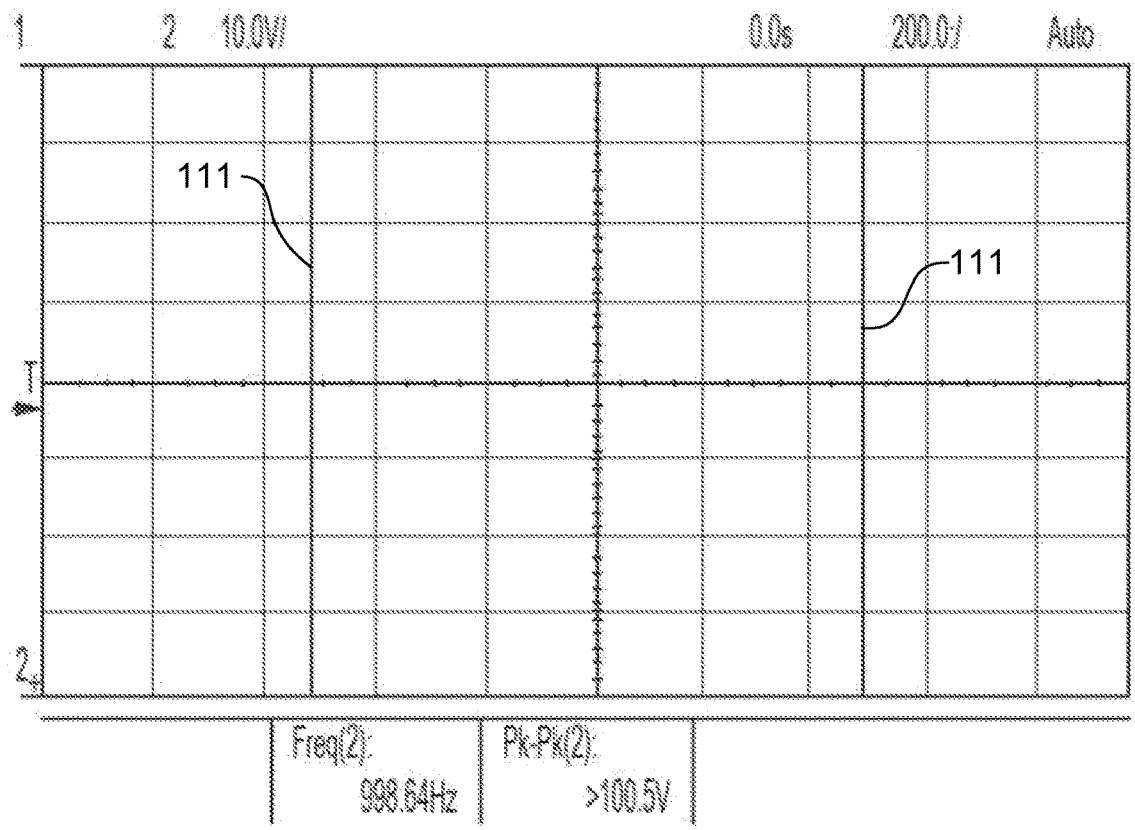
FIG. 15 is a chart showing the output of a function generator circuit according to an embodiment of the present technology as measured with a digital oscilloscope.

In some embodiments, the function generator 110 was tested using a digital oscilloscope along with the 1:10 probe to demonstrate the output of the system 100. A 1000 V DC signal from the high-voltage DC-DC converter 106 was applied to the input of the function generator 110 and the frequency set to 1000 Hz. FIG. 15 shows the resulting high-voltage square wave 111. As shown in the figure, the output frequency is approximately 1 kHz and the peak-to-peak voltage is approximately 100 V, which is 1/10 of the actual output voltage due to the 1:10 probe that was attached to the oscilloscope for safety purposes.

In some embodiments, the triggering circuit 112 was testing using the high-voltage DC-DC converter 106 as the input voltage source and a digital multimeter for reading the outputs of the triggering circuit 112. The output pins 113 were tested in various connection modes, such as grounded, disconnected, and connected to the input voltage. The triggering circuit 112 was found to be fully functional and it worked properly with appropriate input signals. The grounded output pin 113 tested approximately 0 V, the disconnected output pin 113 tested approximately −34 V, and the output pin 113 connected to the input voltage tested approximately 100 V. More details regarding the test results are shown in U.S. Provisional Patent Application No. 62/932,569, the contents of which are incorporated herein in its entirety.

In some embodiments, the fully assembled high-voltage power supply system 100 was tested using a digital multimeter and an oscilloscope. The output voltage was set to 80% (e.g., 800 V), the frequency was set to 100 Hz, and one output pin 113 of the first triggering circuit 112 was connected to the oscilloscope via a 1:10 probe and another output pin 113 from the second triggering circuit 112 was connected to the digital multimeter. The system 100 functioned exactly as expected, with the oscilloscope showing a high-voltage square wave 111 of 100 Hz, and the multimeter reading 400 V, which is the average value of an 800 V square wave. More details regarding the test results are shown in U.S. Provisional Patent Application No. 62/932,569, the contents of which are incorporated herein in its entirety.

Figure 16:
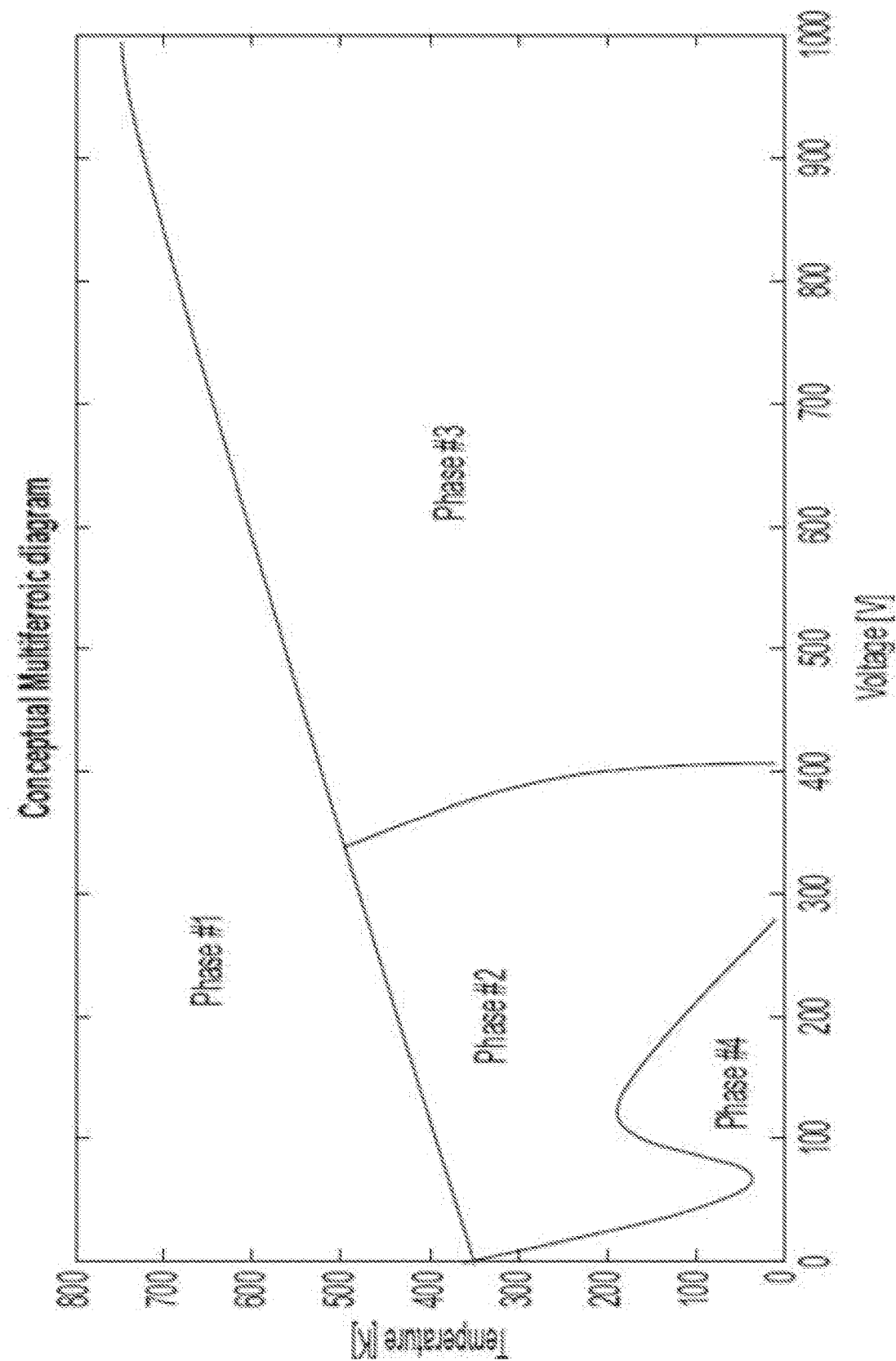
FIG. 16 is a chart showing the relationship between temperature and voltage on phase transition in multiferroic materials.
Figure 17:
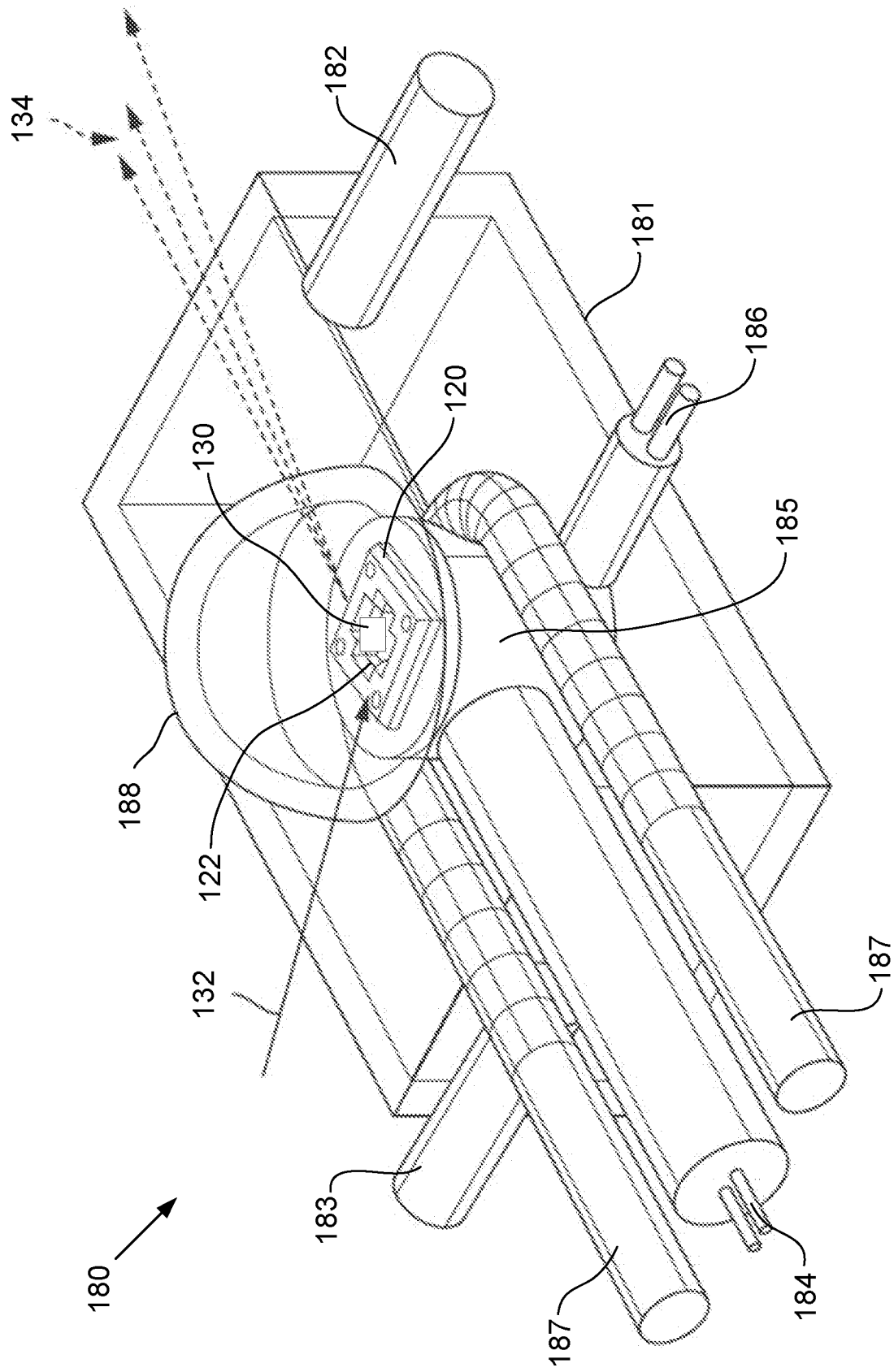
FIG. 17 is a perspective view of a thermal stage system according to an embodiment of the present technology.

FIG. 16 is a chart showing the relationship between temperature and voltage on phase transition in multiferroic material. FIG. 17 shows a thermal stage system 180 according to an embodiment of the present technology. Thermal stage system 180 includes a chamber 181 having cooling capability via an inlet pipe 182 and an outlet pipe 183 for nitrogen gas flow through the chamber 181. In some embodiments, the chamber 181 includes heating capability via a heater current 184. In some embodiments, chamber 181 includes a tower 185 that supports a multiferroic material 130 positioned in the socket 122 of a capacitor-like sample cartridge 120 as described above. In some embodiments, the tower 185 is formed of thermally stable materials. Preferably, cartridge 120 is connected to a high-voltage power supply 100 as described above via high-voltage wires 186. In some embodiments, the chamber 181 includes additional cooling capability via a liquid nitrogen flow conduit 187 that enters the chamber 181 and at least partially surrounds the tower 185 before exiting the chamber 181. In some embodiments, the chamber 181 includes an X-ray dome 188 at least partially surrounding the sample 130 for exposing the sample 130 to incident X-ray beams 132 such that diffracted light 134 from the sample 130 can be observed and measured.

Figure 18:
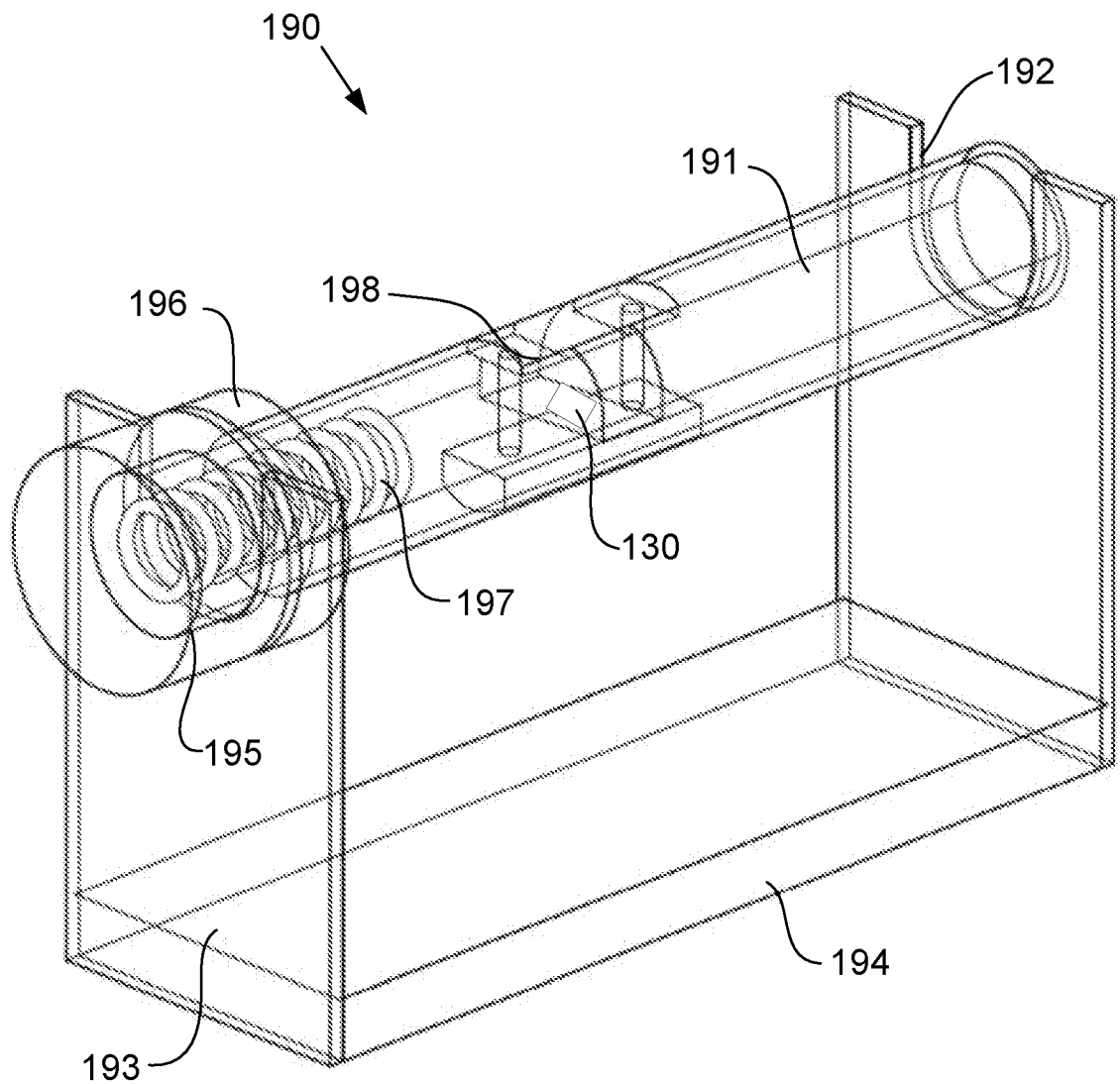
FIG. 18 is a perspective view of a sample fixture according to an embodiment of the present technology.

FIG. 18 shows a sample fixture 190 for use with magnetoelectric testers and faraday shield designs for external noise shielding according to an embodiment of the present technology. Sample fixture 190 includes a tube 191 positioned within grooves 192 of upright opposing walls 193 that are supported by base 194. In some embodiments, the tube 191 is fastened within the grooves 192 via cap 195 that secures a top section of one of the walls 193 between the cap 195 and a flange 196. In some embodiments, cap 195 has a threaded member 197 that is received by corresponding threaded opening within the tube 191. Tube 191 preferably includes a socket 198 configured to retain a multiferroic material 130. In some embodiments, the sample fixture 190 is sized for the dimensions of the Helmholtz coils of a magnetoelectric tester.

Although the technology has been described and illustrated with respect to exemplary embodiments thereof, it should be understood by those skilled in the art that the foregoing and various other changes, omissions, and additions may be made there and thereto, without departing from the spirit and scope of the present technology.

What is claimed is:

1. A high-voltage power supply system, comprising:
   a high-voltage regulator, comprising;
   a microcontroller;
   a digital-to-analog converter in communication with the microcontroller; and
   a high-voltage DC-DC converter in communication with the digital-to-analog converter;
   a function generator comprising a high-voltage inverter including one or more MOSFET switches, wherein the high-voltage inverter is in communication with the microcontroller of the high-voltage regulator; and
   a triggering circuit comprising one or more high-voltage electromechanical switches;
   wherein the triggering circuit further comprises one or more reed relay switches, at least one NOR, and at least one Darlington array.

2. The system of claim 1, wherein the high-voltage DC-DC converter has a maximum voltage output of approximately 1000 V.

3. The system of claim 2, wherein the function generator further comprises two digital pins connected to the microcontroller, and one or more high-voltage MOSFET switches.

4. The system of claim 1, wherein the triggering circuit further comprises an output channel having a plurality of output pins.

5. The system of claim 4, further comprising a cartridge comprising a plurality of electrical plates and a socket having a plurality of pins, wherein the plurality of electrical plates are in communication with the plurality of output pins of the triggering circuit.

6. The system of claim 5, wherein the socket of the cartridge has two pins.

7. The system of claim 5, wherein the socket of the cartridge has four pins.

8. The system of claim 5, further comprising a multiferroic material sample positioned in the socket of the cartridge.

9. The system of claim 8, wherein the multiferroic material sample comprises ferroelectric BaTiO3 nanopowder.

10. The system of claim 1, further comprising a computing device configured to communicate operation commands to the microcontroller of the high-voltage regulator.

11. A method for providing a high-voltage power supply, comprising:
    communicating a first control code from a microcontroller to a digital-to-analog converter;
    generating a programmable high voltage via a high-voltage DC-DC converter in communication with the digital-to-analog converter;
    transmitting the programmable high voltage to a function generator;
    communicating a second control code from the microcontroller to the function generator;
    generating, via the function generator, a programmable high-voltage square wave;
    transmitting the programmable high voltage square wave to a triggering circuit;
    communicating a third control code from the microcontroller to the triggering circuit;
    operating one or more electromechanical switches of the triggering circuit to transmit the programmable high-voltage square wave to one or more of a plurality of output pins of the triggering circuit; and
    transmitting the programmable high-voltage square wave to a cartridge comprising a plurality of electrical plates and a socket, wherein the plurality of electrical plates are in communication with the plurality of output pins of the triggering circuit, and wherein a multiferroic material sample is positioned in the socket of the cartridge.

12. The method of claim 11, further comprising communicating an initialization code from a computer device to the microcontroller.

13. The method of claim 11, wherein the high-voltage DC-DC converter has a maximum voltage output of approximately 1000 V.

14. The method of claim 11, wherein the function generator comprises two digital pins connected to the microcontroller, a high-voltage inverter, and one or more high-voltage MOSFET switches.

15. The method of claim 11, wherein the triggering circuit further comprises one or more reed relay switches, at least one NOR, and at least one Darlington array.

16. The method of claim 11, wherein the multiferroic material sample comprises ferroelectric BaTiO3 nanopowder.

17. A thermal stage system, comprising:
    a chamber comprising an inlet port for a first fluid and an outlet port for the first fluid;

a cartridge positioned inside the chamber, the cartridge comprising a plurality of electrical plates and a socket having a plurality of pins;

wherein the socket of the cartridge is configured to retain a multiferroic material;

a conduit at least partially surrounding the cartridge inside the chamber, the conduit housing a second fluid; and a high-voltage source, comprising:

a high-voltage regulator, comprising;

a microcontroller;

a digital-to-analog converter component in communication with the microcontroller; and a high-voltage DC-DC converter in communication with the digital-to-analog converter;

a function generator comprising a high-voltage inverter including one or more MOSFET switches, wherein the high-voltage inverter is in communication with the microcontroller of the high-voltage regulator; and a triggering circuit comprising one or more high-voltage electromechanical switches and a plurality of output pins in communication with the plurality of electrical plates of the cartridge.

18. The system of claim 17, wherein the first fluid is nitrogen gas and the second fluid is liquid nitrogen.

* * * * *